United States Patent
Yamamoto et al.

(10) Patent No.: US 7,163,729 B2
(45) Date of Patent: *Jan. 16, 2007

(54) NONLINEAR OPTICAL THIN FILM, OPTICAL RECORDING MEDIUM USING NONLINEAR OPTICAL FILM AND OPTICAL SWITCH

(75) Inventors: Hiroki Yamamoto, Hitachi (JP); Takashi Naito, Mito (JP)

(73) Assignee: Hitachi, Ltd., Tokyo (JP)

( * ) Notice: Subject to any disclaimer, the term of this patent is extended or adjusted under 35 U.S.C. 154(b) by 135 days.

This patent is subject to a terminal disclaimer.

(21) Appl. No.: 10/832,310

(22) Filed: Apr. 27, 2004

(65) Prior Publication Data

US 2004/0197517 A1 Oct. 7, 2004

Related U.S. Application Data

(63) Continuation of application No. 10/229,033, filed on Aug. 28, 2002, now Pat. No. 6,730,384.

(30) Foreign Application Priority Data

Dec. 28, 2001 (JP) ........................................ 2001-400318

(51) Int. Cl.
*B32B 3/02* (2006.01)

(52) U.S. Cl. .................... 428/64.1; 428/64.4; 430/270.1
(58) Field of Classification Search ............... 428/64.1, 428/64.4, 688, 702, 913; 430/270.1, 495.1, 430/945

See application file for complete search history.

(56) References Cited

U.S. PATENT DOCUMENTS

| | | | | |
|---|---|---|---|---|
| 5,470,628 A | * | 11/1995 | Tominaga et al. | 428/64.4 |
| 5,591,500 A | * | 1/1997 | Kawanishi | 428/64.1 |
| 6,348,251 B1 | | 2/2002 | Tsai et al. | |
| 6,524,766 B1 | | 2/2003 | Ariyoshi et al. | |
| 6,965,556 B1 | * | 11/2005 | Kikukawa et al. | 369/284 |
| 2001/0038900 A1 | | 11/2001 | Todori et al. | |
| 2003/0039200 A1 | | 2/2003 | Shintani et al. | |
| 2004/0257968 A1 | * | 12/2004 | Kim et al. | 369/275.2 |

FOREIGN PATENT DOCUMENTS

| | | |
|---|---|---|
| EP | 1 094 454 | 4/2001 |
| JP | 6-162564 | 6/1994 |
| JP | 6-267078 | 9/1994 |
| JP | 8-96412 | 4/1996 |
| JP | 11-337988 | 12/1999 |
| JP | 2000-11455 | 1/2000 |
| JP | 2001-84643 | 3/2001 |

OTHER PUBLICATIONS

Nikkei Electronics, No. 788, Jan. 29, 2001, pp. 160–167.
"A New Super–Resolution Film Applicable to Read–Only and Rewritable Optical Disks", Shintani et al, J. Appl. Phys., vol. 38, pp. 1656–1660, Part 1, No. 3B Mar. 1999.

* cited by examiner

*Primary Examiner*—Elizabeth Mulvaney
(74) *Attorney, Agent, or Firm*—Antonelli, Terry, Stout & Kraus, LLP

(57) ABSTRACT

An optical information recording medium uses a nonlinear optical thin film formed on a substrate. The nonlinear optical thin film comprises an amorphous alloy or a mixture of the amorphous alloy and an oxide glass component, and has a refractive index which changes in response to a change of intensity of a laser beam incident thereto.

16 Claims, 13 Drawing Sheets

LIGHT SOURCE

1nm 15  14

LIGHT SOURCE

NONLINEAR OPTICAL THIN FILM, OPTICAL RECORDING MEDIUM USING NONLINEAR OPTICAL FILM AND OPTICAL SWITCH

CROSS REFERENCE TO RELATED APPLICATION

This is a continuation of U.S. application Ser. No. 10/229,033, filed Aug. 22, 2002, now U.S. Pat. No. 6,730,384, the subject matter of which is incorporated by reference herein.

BACKGROUND OF THE INVENTION

This invention relates to a nonlinear optical thin film having a large change of a refractive index and an optical recording medium using the nonlinear optical thin film.

As a so-called "computerized society" using optical communication has made a remarkable progress in recent years, it has become more and more necessary to build up a communication system capable of communicating large quantities of information at a higher speed. A wavelength multiplex communication system (WDM) has been expanded at present and a communication speed of a network has rapidly become higher and higher. Optical devices indispensable for expanding such a large-capacity high-speed optical communication include an optical recording medium for storing large capacity optical information and an optical switch capable of switching communication light at a high speed.

DVD (Digital Versatile Disk) having a 4.7 GB capacity on each surface has been put into practical application as the optical recording medium. This disk has now been wide spread as a medium for handling large-capacity dynamic images such as a video tape besides a computer use. DVD has been practically used as a rewritable memory besides ROM (Read-Only Memory: DVD-ROM) in which information is directly written to a substrate.

Research and development has been made to attain high recording density in such an optical recording medium. The use of a laser beam having a shorter wavelength (approx. 650 nm) than a laser beam used for CD (780 nm) has been proposed as means for attaining higher recording density in information recording.

To handle large-capacity information such as computer graphics, however, the recording density must yet be improved by 1.5 to 2 times. Therefore, development of DVD that utilizes blue-semiconductor laser using a shorter wavelength (405 nm) has been developed.

Another possible technology for attaining higher recording density is a super-resolution film. This super-resolution film is formed on an upper or lower surface of a recording medium, and high recording density can be achieved when a beam spot of incident light transmitting through, or reflected by, this film is reduced.

One of the mechanisms of the super-resolution effect is an absorption-saturation phenomenon. This is a phenomenon utilizing nonlinear optical characteristics such that the super-resolution film allows transmission of light having intensity above its absorption saturation limit but absorbs light having intensity below this level. Spatial intensity of a laser beam used for writing and reading information has a Gaussian distribution. Therefore, when the laser beam transmits the super-resolution film, light is absorbed at the skirts having low intensity but transmits the super-resolution film at the center where intensity is high. In consequence, the beam diameter after transmission can be reduced.

The super-resolution film known at present is a phthalocyanine organic film and a chalcogenide complex described in JP-A-8-96412 laid-open on Apr. 12, 1996. A use of a thermochromic material described in JP-A-6-162564 laid-open on Jun. 10, 1994 and a photochromic material described in JP-A-6-267078 laid-open on Sep. 22, 1994 for the super-resolution film has also been tried.

In the super-resolution film described in JP-A-8-96412, energy density of the beam locally reaches an extremely high level when a read or write operation is made. For this reason, the film is likely to gradually get deteriorated in the course of repetition of the write and read operations. It is therefore not easy to ensure a sufficient number of times of repetition of write/read operations under a severe environment of use as in RAM of computers, and so forth. Since chalcogenide is chemically unstable, it is difficult to acquire a sufficient guarantee term.

In the field of optical switches, on the other hand, attempts have also been made to improve the operation speed. Switching of optical information according to the prior art technologies requires opto-electric conversion for once converting optical information to electrical information at a relay point. To solve the problems such as the increase of consumed power resulting from the increase of the number of relay points and the high switching speed, however, switching is preferably conducted by light. Therefore, mechanical type optical switches, planar photo-waveguide type optical switches, mirror type optical switches and bubble type switches have been examined (Nikkei Electronics, No. 788, Jan. 29, 2001, pp.160–167).

The optical switches described above have a switching time of about several milliseconds and cannot readily cope with higher data capacity and higher operation speed of optical communication that are expected in future. In the switches described above, electrical driving force for switching is great and energy consumption yet remains great. Therefore, JP-A-11-337988 laid-open on Dec. 10, 1999 proposes a full optical switch using a nonlinear optical material and having high response by light.

SUMMARY OF THE INVENTION

Attempts have been made in the field of information recording media to acquire a recording medium having higher recording density. Nonetheless, the super-resolution film described above does not have a sufficient super-resolution effect to cope with higher recording density expected in future. It is therefore an object of the invention to acquire a recording medium having a super-resolution film capable of reading or writing in higher density.

In conjunction with the optical switch, it is expected that the numbers of relay points and switches increase in future with the necessity for switching of future multi-channel optical communication signals, and energy consumption necessary for switching becomes greater, too. It is therefore another object of the invention to acquire an optical switch capable of switching with smaller energy consumption.

According to one aspect of the invention, there is provided a nonlinear optical thin film comprising an amorphous alloy or a mixture of the amorphous alloy and an oxide glass component and formed on a substrate either directly or through other layer, wherein the thin film is exposed to light irradiated from outside, and its refractive index reversibly changes in accordance with a change of intensity of light incident into the thin film.

According to another aspect of the invention, there is provided a nonlinear optical thin film comprising an amorphous alloy or a mixture of the amorphous alloy and an oxide glass component and formed on a substrate either directly or through other layer, wherein a change ratio ($|n_1-n_0|/n_o$) of a refractive index $n_0$ measured when intensity of laser incident to the thin film is 0.1 GW/m² to a refractive index $n_1$ when measured at 5.0 GW/m² is at least 0.2.

According to another aspect of the invention, there is provided a nonlinear optical thin film, wherein the nonlinear optical thin film is constituted by an amorphous alloy of at least two kinds of metals selected from the group consisting of Co, Cr, Ni, V, Mn, Ti, Zr, Hf and Ta, and can contain oxide glass consisting of $SiO_2$ as its principal component. The nonlinear optical thin film described above is nonmagnetic, and is a Co—Cr—Zr or Ni—Cr—Zr type amorphous alloy.

According to still another aspect of the invention, the optical recording medium uses the nonlinear optical thin film described above as a super-resolution film.

According to still another aspect of the invention, there is provided an optical recording medium including at least a substrate on which pits having information are formed and a super-resolution film formed on the substrate either directly or through other layer, wherein the super-resolution film is a film made of an amorphous alloy or a mixture of the amorphous alloy and an oxide glass component, and its refractive index reversibly changes in accordance with a change of intensity of a laser beam incident to the thin film.

According to still another aspect of the invention, there is provided a rewritable recording medium including at least a substrate, a recording film which is formed on the substrate either directly or through other layer and to which information is written by light and a super-resolution film formed on the recording film either directly or through other layer, wherein the super-resolution film is a film made of an amorphous alloy or a mixture of the amorphous alloy and oxide glass component, and its refractive index reversibly changes in accordance with a change of intensity of a laser beam incident to the thin film.

According to still another aspect of the invention, there is provided a read-only recording medium including at least a substrate on which pits having information are formed, a super-resolution film formed on the substrate either directly or through other layer and a reflection film formed on the super-resolution film either directly or through other layer, wherein the super-resolution film is a thin film made of an amorphous alloy or a mixture of the amorphous alloy and an oxide glass component, and its refractive index reversibly changes in accordance with a change of intensity of a laser beam incident to the thin film.

According to still another aspect of the invention, there is provided a rewritable optical recording medium including at least a substrate, a super-resolution film formed on the substrate either directly or through other layer, a recording film which is formed on the super-resolution film and to which information is written by light, and a reflection film formed on the recording film, wherein the super-resolution film is a thin film made of an amorphous alloy or a mixture of the amorphous alloy and an oxide glass component, and its refractive index reversibly changes in accordance with a change of intensity of a laser beam incident to the thin film.

A change ratio ($|n_1-n_0|/n_o$) of a refractive index $n_0$ measured when intensity of the laser beam incident to the super-resolution film is 0.1 GW/m² to a refractive index $n_1$ when measured at 5.0 GW/m² is at least 0.2.

Further, the amorphous alloy is made of at least two kinds of metals selected from the group consisting of Co, Cr, Ni, V, Mn, Ti, Zr, Hf and Ta and oxide glass described above is glass consisting of $SiO_2$ as its principal component.

According to still another aspect of the invention, there is provided an optical switch including at least one or a plurality of optical switching devices each constituted by a nonlinear optical thin film made of an amorphous alloy or a mixture of the amorphous alloy and an oxide glass component, and a controlling light irradiation device for irradiating controlling light, wherein a refractive index of the nonlinear optical thin film reversibly changes in accordance with a change of intensity of light incident to the thin film.

A change ratio ($|n_1-n_0|/n_o$) of a refractive index $n_0$ measured when intensity of light incident to the nonlinear optical thin film is 0.1 GW/m² to a refractive index $n_1$ when measured at 5.0 GW/m² is at least 0.2. The amorphous alloy is made of at least two kinds of metals selected from the group consisting of Co, Cr, Ni, V, Mn, Ti, Zr, Hf and Ta and oxide glass described above is glass consisting of $SiO_2$ as its principal component.

Other objects, features and advantages of the invention will become apparent from the following description of the embodiments of the invention taken in conjunction with the accompanying drawings.

DESCRIPTION OF THE EMBODIMENTS

[Embodiment 1]

Figure 2:
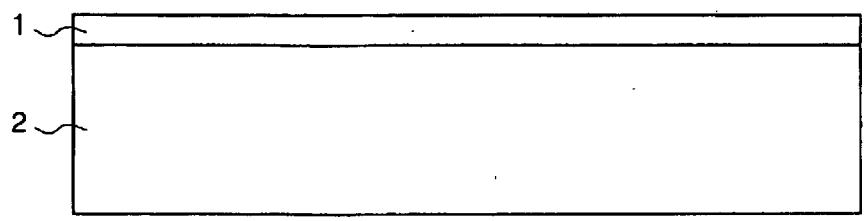
FIG. 2 is a sectional view of a sample for optically evaluating a nonlinear optical thin film according to the embodiment of the invention.

First, a thin film sample shown in FIG. 2 is fabricated to evaluate optical characteristics of a nonlinear optical thin film according to an embodiment of the invention. An amorphous alloy thin film having a composition of $Co_{0.6}Cr_{0.3}Zr_{0.1}$ in a molar ratio is formed to a thickness of 50 nm on a substrate 2 as a material of a nonlinear optical thin film 1 in this embodiment. A magnetron sputter method is employed to form the film. A metal alloy target having the same composition as that of the thin film and a diameter of 4 in. is used as a target. Film formation power is 600 W. A sputter gas is argon (Ar) and a gas pressure is 0.65 Pa.

The $Co_{0.6}Cr_{0.3}Zr_{0.1}$ thin film so obtained is subjected to X-ray diffraction. Because no peak representing the existence of a crystalline material is observed, the thin film is found amorphous.

Figure 3:
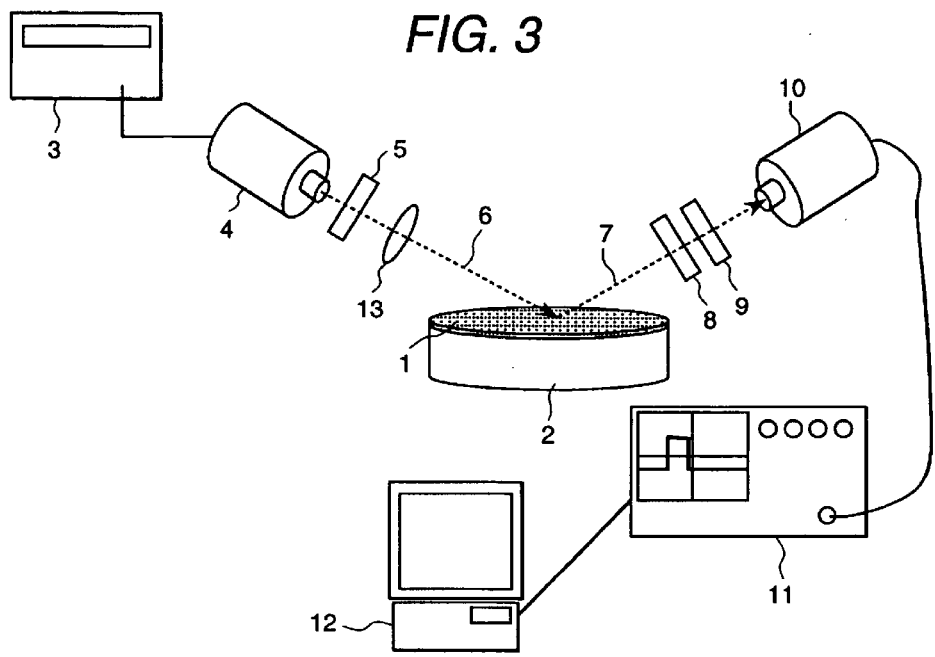
FIG. 3 is a schematic view of an evaluation optical system of the nonlinear optical thin film according to the embodiment of the invention.

A refractive index of the nonlinear optical thin film material shown in FIG. 2 is evaluated by using an optical system of an ellipsometer shown in FIG. 3. In this drawing, reference numeral 1 denotes a nonlinear optical thin film. Reference numeral 2 denotes a substrate. Reference numeral 3 denotes a pulse generator. Reference numeral 4 denotes a light source. Reference numeral 5 denotes a polarizer. Reference numeral 6 denotes incident light. Reference numeral 7 denotes reflected light. Reference numeral 8 denotes an analyzer. Reference numeral 9 denotes a filter. Reference numeral 10 denotes a detector. Reference numeral 11 denotes a digital oscilloscope. Reference numeral 12 denotes a computer for control and reference numeral 13 denotes a focal lens.

The light source 4 uses a semiconductor laser having wavelengths of 650 nm and 504 nm. The pulse generator 3 converts this laser to a pulse beam having desired intensity and time. The polarizer 5 polarizes the pulse beam to light (s polarized light) the oscillation surface of which is parallel to the sample surface and light (p polarized light) vertical to the sample surface. The focal lens 13 condenses the laser beam to the sample surface. The laser diameter at the condensing portion is 0.9 µm at the wavelength of 650 nm and 0.6 nm at the wavelength of 405 nm.

When such polarized light is irradiated to the sample, the reflection factor and the phase are different between s polarized light and p polarized light depending on the film thickness of the sample, its refraction index and its extinction coefficient. Therefore, when the film thickness is in advance measured and a ratio of the reflection factors and the phases are determined, the refractive index and the extinction coefficient can be estimated. Here, the imaginary unit of the refractive index represents the extinction coefficient, and it is a parameter relating to optical absorption of the material.

The analyzer 8 is positioned on the detector side. The angle of the analyzer 8 is rotated and the reflection factor ratio of s polarized light and p polarized light and their phases are determined from power of reflected light obtained at each analyzer angle. One turn of the analyzer angle is divided into 12 angles and measurement is made at each angle. When the rays of light exceeding an allowable limit are incident to the detector, an appropriate analysis cannot be made. Therefore, the filter 9 is positioned in accordance with the intensity of each pulse beam to regulate power of reflected light incident to the detector.

The digital oscilloscope 11 divides time-wise the ray of light introduced into the detector and measurement is made every 2 ns. Measurement is started 50 nm ahead of the incidence of the pulse beam and is continued for 100 ns from the generation of the pulse. When measurement is made only once, an S/N (signal-to-noise ratio) is low due to variance of the laser and the detector and due to electrical noise. Therefore, measurement is made 128 times and an average is calculated.

Figure 4A:
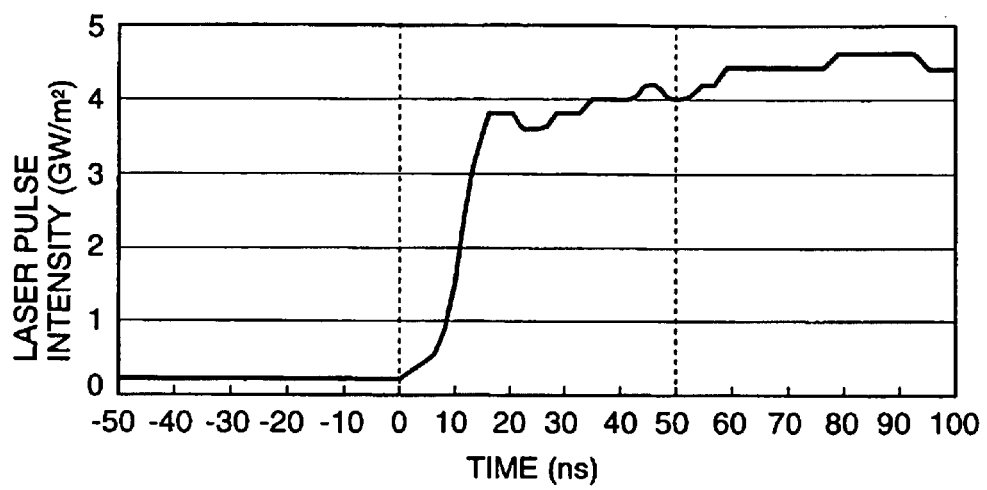
FIGS. 4A and 4B are graphs each showing a time change of a refractive index by irradiation of a pulse beam acquired from the evaluation optical system shown in FIG. 3.
Figure 4B:
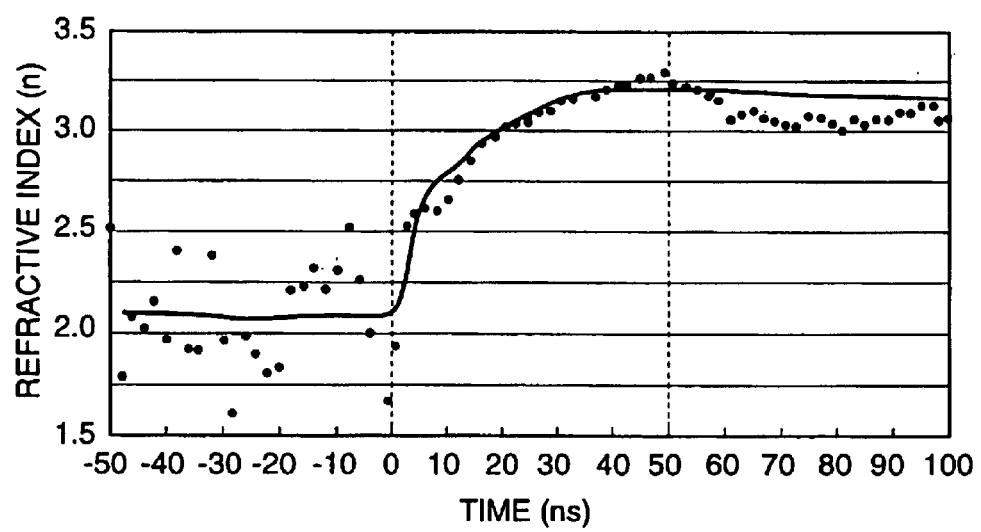

FIGS. 4A and 4B show the change of the refractive index when a 100 ns pulse laser is irradiated to the nonlinear optical thin film fabricated in this embodiment. Intensity of the pulse beam is 5.0 GW/m². The abscissa represents the time when the pulse rise time is 0. FIG. 4A shows the intensity change of the laser pulse. FIG. 4B shows the time change of the refractive index (n).

Intensity of light incident to the detector is low before the rise of the pulse and variance of the measurement values is therefore great. The refractive index $n_0$ is 2.3. The refractive index no measured at this weak laser is called a "linear refractive index". Intensity of the laser beam at this time is about 0.1 GW/m². The pulse rises from the time 0 (sec) and the refractive index gradually rises with the rise of the pulse. When light power of the pulse gets into saturation, the change of the refractive index gets into saturation, too. The refractive index $n_1$ at this time is 3.25, and the change ratio of refractive index $|n_1 - n_0|/n_o$ exhibits a great change of 0.41. The refractive index $n_1$ at the time when this strong laser beam of about 5.0 GW/m² is irradiated is defined as a "nonlinear refractive index".

Figure 5:
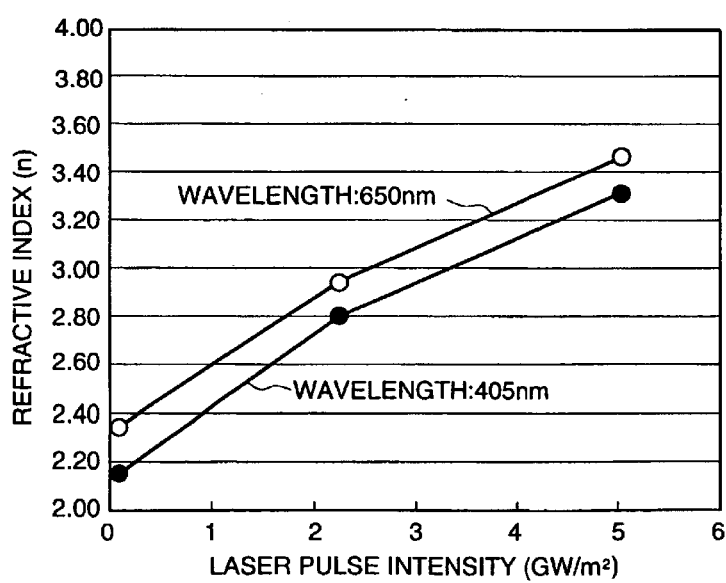
FIG. 5 is a graph showing the relation between laser pulse intensity and the refractive index shown in FIGS. 4A and 4B.
Figure 6:
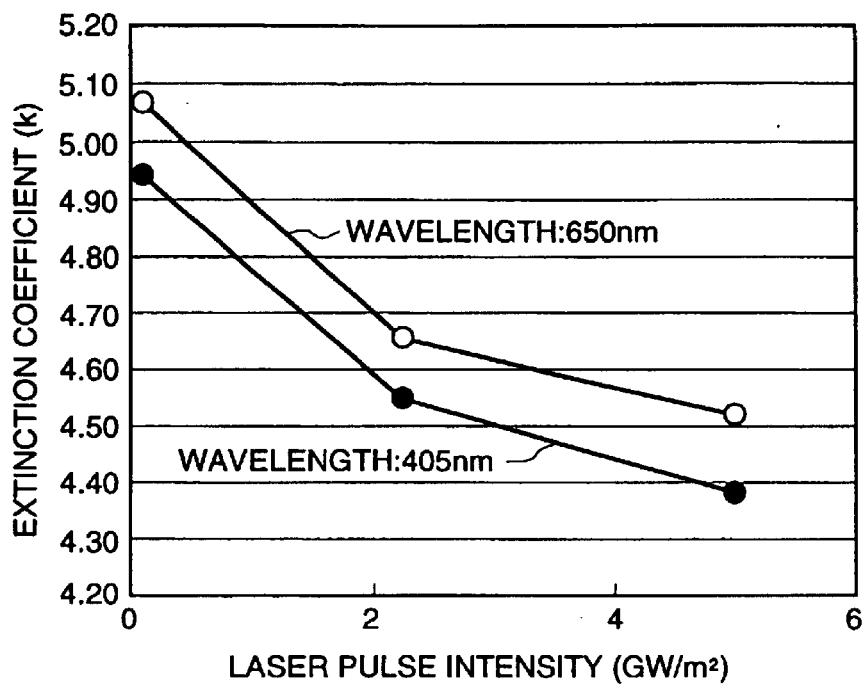
FIG. 6 is a graph showing the relation between laser pulse intensity and the refractive index.

FIGS. 5 and 6 show the time change of the refractive index (n) and the extinction coefficient (k) when the pulse beam intensity is changed. In these graphs, each of the refractive index and the extinction coefficient is determined by averaging the refractive indices during 50 ns to 100 ns after the rise of the pulse beam in FIG. 4 that shows the change of the refractive index.

The refractive index rises with the increase of the pulse beam intensity at each of the wavelengths of 650 nm and 405 nm, and rises from 2.3 to 3.3 at 650 nm. The refractive index remains at a low level at 405 nm but exhibits a large change. The extinction coefficient drops from 5.05 to 4.51 at 650 nm. The extinction coefficient, too, has a lower value at 405 nm than at 650 nm but exhibits a similar change to the change at 650 nm.

As described above, it has been found that the refractive index of the Co—Cr—Zr amorphous alloy thin film according to this embodiment exhibits a great nonlinear change upon irradiation of the laser beam of about 5.0 $GW/m^2$.

The change ratio of the refractive index has correlation not only with the material composition but also with the intensity of the laser beam irradiated. The laser intensity necessary for acquiring the same refractive index is smaller in a thin film having a large change ratio of the refractive index than in conventional materials having a small change ratio of the refractive index. When compared with a material having a similar response time of the change of the refractive index to laser irradiation, the response time for acquiring the same refractive index is shorter, and the thin film having the great change ratio of the refractive index can respond more quickly to laser irradiation.

Next, the response speed of the change of the refractive index of this thin film is examined in detail. It can be understood from the measurement results shown in FIGS. 4A and 4B that the rise of the refractive index changes while following the rise of the pulse laser. Since the interval of this measurement is 2 ns, it can be understood that the refractive index changes at a response speed lower than 2 ns. However, the apparatus used cannot measure the change of the refractive index in a shorter time interval than 2 ns.

To examine in further detail the response speed of the refractive index, the change of the refractive index by pulse laser irradiation with a pulse time of 35 ps and time response is examined. As a result, a similar change of the refractive index is observed in such a short time in the same way as in the case of 2 ns. It is understood from this result that the response speed of this material is in the order of ps (picosecond).

The change of the refractive index is measured for thin film materials of various compositions and similar examination is made. Table 1 tabulates the composition of each thin film, its film thickness, a linear refractive index no of each film measured at laser power of 0.1 $GW/m^2$, its nonlinear refractive index $n_1$ measured at 5.0 $GW/m^2$, a change ratio of refractive index $|n_1-n_0|/n_0$, extinction coefficient $k_0$, $k_1$ and its change ratio $|k_1-k_0|/k_0$. When broad angle X-ray diffraction analysis is conducted for the alloys shown in Table 1, a peak representing the existence of a crystalline material is not observed and each film is found an amorphous alloy thin film.

TABLE 1

| Sample No. | Composition (molar ratio) | Film thickness (nm) | Wavelength: 650 nm | | | | | | Wavelength: 405 nm | | | | | |
|---|---|---|---|---|---|---|---|---|---|---|---|---|---|---|
| | | | $n_0$ | $n_1$ | $|n_1-n_0|/n_0$ | $k_0$ | $k_1$ | $|k_1-k_0|/k_0$ | $n_0$ | $n_1$ | $|n_1-n_0|/n_0$ | $k_0$ | $k_1$ | $|k_1-k_0|/k_0$ |
| 1 | $Co_{0.6}Cr_{0.3}Zr_{0.1}$ | 20 | 2.34 | 3.27 | 0.397 | 5.14 | 4.55 | 0.115 | 2.21 | 3.14 | 0.421 | 5.02 | 4.38 | 0.127 |
| 2 | $Co_{0.6}Cr_{0.3}Zr_{0.1}$ | 50 | 2.07 | 3.30 | 0.594 | 5.35 | 4.54 | 0.151 | 1.98 | 3.11 | 0.571 | 5.28 | 4.32 | 0.182 |
| 3 | $Co_{0.6}Cr_{0.3}Zr_{0.1}$ | 100 | 2.34 | 3.46 | 0.479 | 5.07 | 4.52 | 0.108 | 2.12 | 3.25 | 0.533 | 4.95 | 4.41 | 0.109 |
| 4 | $Ni_{0.6}Cr_{0.3}Zr_{0.1}$ | 20 | 2.65 | 3.47 | 0.309 | 4.79 | 3.86 | 0.194 | 2.54 | 3.16 | 0.244 | 4.52 | 3.74 | 0.173 |
| 5 | $Ni_{0.6}Cr_{0.3}Zr_{0.1}$ | 50 | 2.62 | 3.38 | 0.290 | 4.61 | 4.07 | 0.117 | 2.52 | 3.18 | 0.262 | 4.51 | 3.92 | 0.131 |
| 6 | $Ni_{0.6}Cr_{0.3}Zr_{0.1}$ | 100 | 2.57 | 3.37 | 0.311 | 4.77 | 4.21 | 0.117 | 2.47 | 3.18 | 0.287 | 4.62 | 4.11 | 0.110 |
| 7 | $Co_{0.6}Cr_{0.3}Hf_{0.1}$ | 50 | 2.45 | 3.34 | 0.363 | 5.22 | 4.71 | 0.098 | 2.35 | 3.29 | 0.400 | 5.07 | 4.67 | 0.079 |
| 8 | $Co_{0.6}Cr_{0.3}Ti_{0.1}$ | 50 | 2.31 | 3.22 | 0.394 | 5.18 | 4.41 | 0.149 | 2.26 | 3.14 | 0.389 | 5.05 | 4.21 | 0.166 |
| 9 | $Ni_{0.6}Cr_{0.3}Hf_{0.1}$ | 50 | 2.71 | 3.51 | 0.295 | 4.82 | 3.95 | 0.180 | 2.58 | 3.35 | 0.298 | 4.66 | 3.76 | 0.193 |
| 10 | $Ni_{0.6}Cr_{0.3}Ti_{0.1}$ | 50 | 2.54 | 3.35 | 0.319 | 4.52 | 3.95 | 0.126 | 2.41 | 3.17 | 0.315 | 4.37 | 3.74 | 0.144 |
| 11 | $Ni_{0.6}Ta_{0.4}$ | 50 | 2.25 | 3.12 | 0.387 | 4.11 | 3.72 | 0.095 | 2.17 | 2.91 | 0.341 | 3.81 | 3.41 | 0.105 |

Samples Nos. 1 to 3 are a $Co_{0.6}Cr_{0.3}Zr_{0.1}$ thin film. They have film thickness of 20 nm, 50 nm and 100 nm. In all these samples, $n_1$ is greater than $n_o$ and its change ratio is greater by at least 0.397 at the wavelength 650 nm. The extinction coefficient much more decreases at $k_1$ than at $k_0$, on the contrary, and its change ratio is 0.10 to 0.15 and is smaller than the change ratio of the refractive index. Both refractive index and extinction coefficient are smaller at 405 nm than at 650 nm and the change ratio is great in the same way as in the case of 650 nm.

Samples Nos. 4 to 6 are a $Ni_{0.6}Cr_{0.3}Zr_{0.1}$ thin film. Their film thickness is 20 nm, 50 nm and 100 nm in the same way as the $Co_{0.6}Cr_{0.3}Zr_{0.1}$ thin film. A large change of the refractive index can be acquired at both wavelengths in the Ni—Cr—Zr thin film, too. However, the change ratio is about a half of the Co—Cr—Zr thin film.

Samples Nos. 7 to 10 are thin films formed by replacing the Zr component in the Co—Cr—Zr and Ni—Cr—Zr thin films by Hf and Ti as the Group IVa metal to which Zr belongs. A large change of the refractive index can be acquired in each of these cases in the same way as in the embodiment described above.

Sample No. 11 is a Ni—Ta binary alloy. This binary alloy is found amorphous by X-ray diffraction, too. It is found that a large change of the refractive index can also be acquired in this case.

As described above, in the amorphous alloy thin films formed of at least two kinds of elements selected from the group of Co, Ni, Cr, Zr, Hf, Ti and Ta, a large change of the refractive index can be obtained by laser irradiation at both measurement wavelengths of 650 nm and 405 nm.

Next, thin films are formed while a glass component such as $SiO_2$ is added to the CoCrZr alloy and the examination is made in the same way as in Table 1. Table 2 shows the measurement result of the change of the refractive index.

TABLE 2

| Sample No. | Composition (molar ratio) | Film thickness (nm) | Wavelength: 650 nm | | | | | | Wavelength: 405 nm | | | | | |
|---|---|---|---|---|---|---|---|---|---|---|---|---|---|---|
| | | | $n_0$ | $n_1$ | $\|n_1 - n_0\|/n_0$ | $k_0$ | $k_1$ | $\|k_1 - k_0\|/k_0$ | $n_0$ | $n_1$ | $\|n_1 - n_0\|/n_0$ | $k_0$ | $k_1$ | $\|k_1 - k_0\|/k_0$ |
| 12 | $0.95(Co_{0.6}Cr_{0.3}Zr_{0.1})$-$0.05SiO_2$ | 50 | 3.380 | 4.560 | 0.349 | 4.800 | 3.810 | 0.206 | 3.210 | 4.480 | 0.396 | 4.650 | 3.740 | 0.196 |
| 13 | $0.90(Co_{0.6}Cr_{0.3}Zr_{0.1})$-$0.10SiO_2$ | 50 | 3.320 | 3.990 | 0.202 | 3.710 | 2.600 | 0.299 | 3.250 | 3.920 | 0.206 | 3.620 | 2.740 | 0.243 |
| 14 | $0.80(Co_{0.6}Cr_{0.3}Zr_{0.1})$-$0.20SiO_2$ | 50 | 3.500 | 3.084 | 0.119 | 1.030 | 0.920 | 0.107 | 3.450 | 3.087 | 0.105 | 0.950 | 0.840 | 0.116 |
| 15 | $0.90(Co_{0.6}Cr_{0.3}Zr_{0.1})$-$0.40SiO_2$ | 50 | 2.400 | 2.154 | 0.103 | 0.670 | 0.630 | 0.060 | 2.310 | 2.075 | 0.102 | 0.580 | 0.570 | 0.017 |
| 16 | $0.90(Co_{0.6}Cr_{0.3}Zr_{0.1})$-$0.10(SiO_2TiO_2)$ | 50 | 3.300 | 4.100 | 0.242 | 3.700 | 2.580 | 0.303 | 3.240 | 4.050 | 0.250 | 3.580 | 2.520 | 0.296 |
| 17 | $0.90(Co_{0.6}Cr_{0.3}Zr_{0.1})$-$0.10(SiO_2-Na_2O-CaO)$ | 50 | 3.350 | 4.020 | 0.200 | 3.850 | 2.780 | 0.278 | 3.220 | 3.950 | 0.227 | 3.740 | 2.610 | 0.302 |
| 18 | $0.90(Co_{0.6}Cr_{0.3}Zr_{0.1})$-$0.10(SiO_2B_2O_2-Na_2O)$ | 50 | 3.210 | 3.950 | 0.231 | 3.740 | 3.020 | 0.193 | 3.140 | 3.780 | 0.204 | 3.660 | 2.960 | 0.191 |
| 19 | Ai | 50 | 1.470 | 1.471 | 0.001 | 7.790 | 7.800 | 0.001 | 1.452 | 1.454 | 0.001 | 7.563 | 7.571 | 0.001 |
| 20 | Si | 50 | 3.851 | 3.853 | 0.001 | 0.017 | 0.018 | 0.059 | 3.821 | 3.818 | 0.001 | 0.005 | 0.005 | 0.000 |
| 21 | Cr | 50 | 3.111 | 3.113 | 0.001 | 3.330 | 3.320 | 0.003 | 2.854 | 2.850 | 0.001 | 3.311 | 3.305 | 0.002 |
| 22 | CoO | 50 | 2.451 | 2.448 | 0.001 | 0.051 | 0.050 | 0.020 | 2.412 | 2.402 | 0.004 | 0.041 | 0.035 | 0.146 |
| 23 | $Co_3O_4$ | 50 | 3.201 | 2.891 | 0.097 | 0.750 | 0.680 | 0.093 | 3.100 | 2.811 | 0.093 | 0.721 | 0.658 | 0.087 |

The amorphous alloy has the composition $Co_{0.6}Cr_{0.3}Zr_{0.1}$ used in Table 1. The amorphous alloy and the oxide glass component are contained at molar ratios of 0.05 to 0.40. When the glass component uses $SiO_2$, $n_1$ is greater than no when the $SiO_2$ content is 0.05 and its change ratio is as great as 0.349 to 0.396. This change is equivalent to that of the sample not containing $SiO_2$. All $n_0$, $n_1$ and the change ratio of the refractive index decrease with the increase of the $SiO_2$ content. Particularly in the case of the thin films containing 0.20 to 0.40 of $SiO_2$, $n_1$ is smaller than no. Further, $k_0$ and $k_1$, too, decrease with the increase of the $SiO_2$ content, and the thin films containing 0.20 to 0.40 of $SiO_2$ lose metallic luster and become transparent. This fact presumably demonstrates that the metal component is oxidized with the increase of the oxide component to invite a large change of the film structure and that the principle of the change of the refractive index alters.

Figure 7:
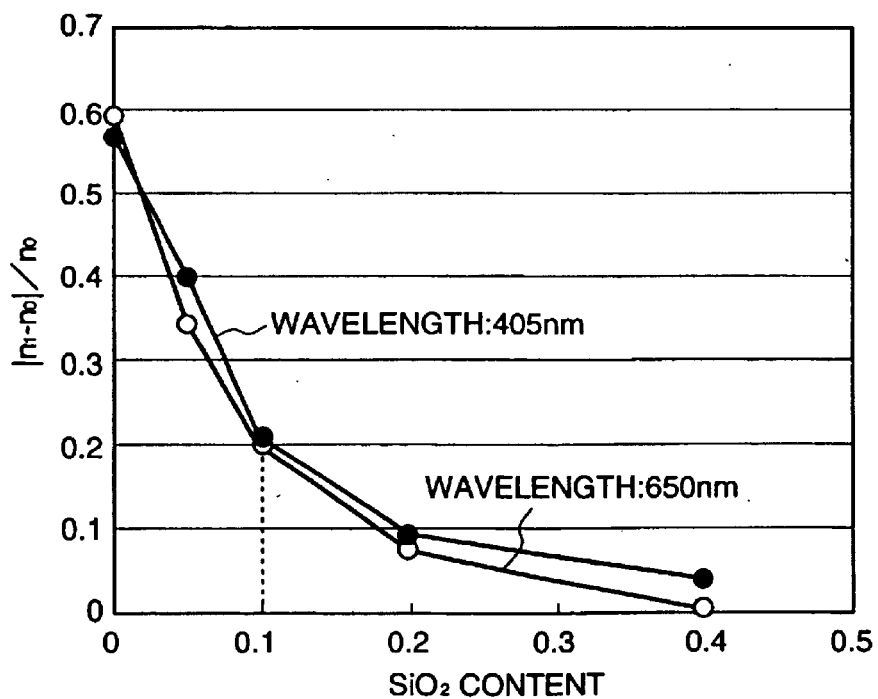
FIG. 7 is a graph showing the relation between a content of $SiO_2$ contained in an amorphous alloy and a change ratio of a refractive index.

FIG. 7 shows the change of the refractive index with respect to the $SiO_2$ content. The change ratio of the refractive index is lower than 0.20 when the $SiO_2$ content exceeds 0.1 at both wavelengths of 650 nm and 405 nm, and a large change of the refractive index cannot be acquired.

It can be understood from Table 2 that when the content of the glass component is 0.1, the change ratio of the refractive index is at least 0.20 and satisfactory results can be obtained when any of $SiO_2$—$TiO_2$, $SiO_2$—$Na_2O$—$CaO$ and $SiO_2$—$B_2O_3$—$Na_2O$ is used.

As described above, the amorphous alloy thin film and the mixed thin film of the amorphous alloy and the oxide glass component exhibit the nonlinear change of the refractive index, and the change ratio of the refractive index is at least 0.2 in terms of the ratio of the linear refractive index no measured by a weak laser beam of 0.1 $GW/m^2$ to the nonlinear refractive index $n_1$ when a strong laser beam of 5.0 $GW/m^2$ is irradiated.

When the content of the glass matrix component is smaller than 0.1, a large change of the refractive index can be acquired. When this content exceeds 0.1, however, the change ratio of the refractive index drastically drops down to 0.2 or below. Therefore, the content of the glass component is preferably 0.1.

Besides SiO2, the glass component is preferably a glass component containing $SiO_2$ as the principal component such as $SiO_2$—$TiO_2$, $SiO_2$—$Na_2O$—$CaO$ and $SiO_2$—$B_2O_3$—$Na_2O$.

Next, to clarify the mechanism of the change of the refractive index of the amorphous alloy thin film, the thin films Nos. 5 and 12 that provide a large change of the refractive index are observed through a transmission electron microscope to inspect the existing condition of the alloy component and the glass component.

Figure 8:
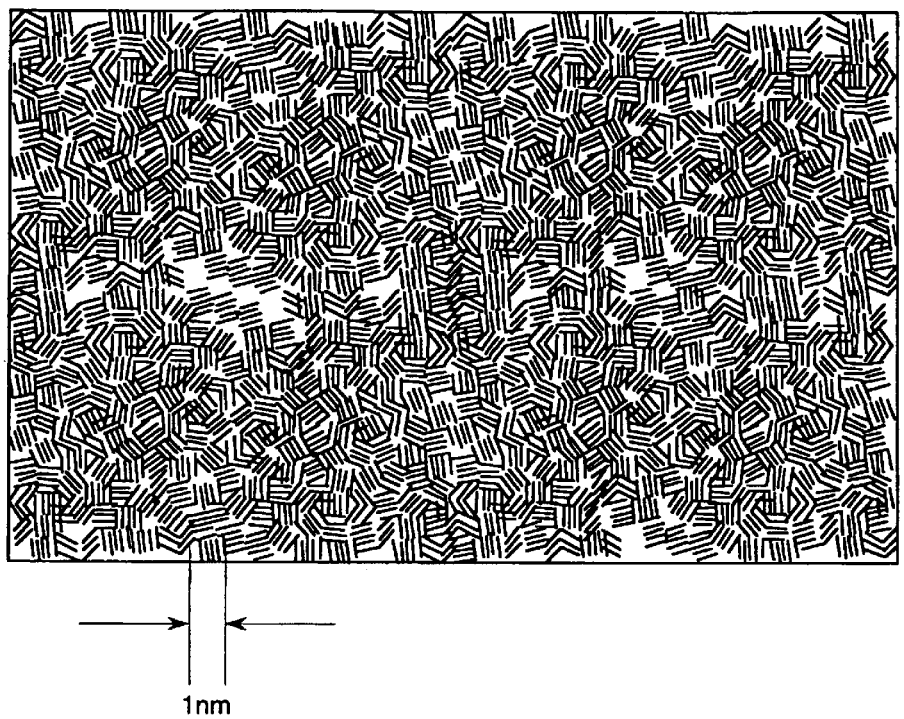
FIG. 8 is a schematic view of a transmission microscopic image of the amorphous alloy.

FIG. 8 is a schematic view of the transmission electron micrograph of the Co—Cr—Zr alloy thin film of Sample No. 5. In this sample, a large number of extremely fine particles having particle diameters of about 0.5 to about 1.0 nm are formed. Since these particles are extremely fine, only a hallo representing the existence of the amorphous material is observed in the broad angle X-ray diffraction shown previously. Therefore, the thin film is defined as being amorphous from X-ray diffraction.

When this thin film is formed while being heated to 300° C. inside a chamber, a peak representing the existence of the crystalline phase can be clearly observed through X-ray diffraction. When the change of the refractive change of this thin film is measured, it is found that the refractive index hardly changes. This is presumably because the nonlinear optical characteristics drop due to coarsening of the particles upon heating. Therefore, to obtain the large change of the refractive index as described above, it can be judged that the film preferably has the fine structure shown in FIG. 8.

Figure 9:
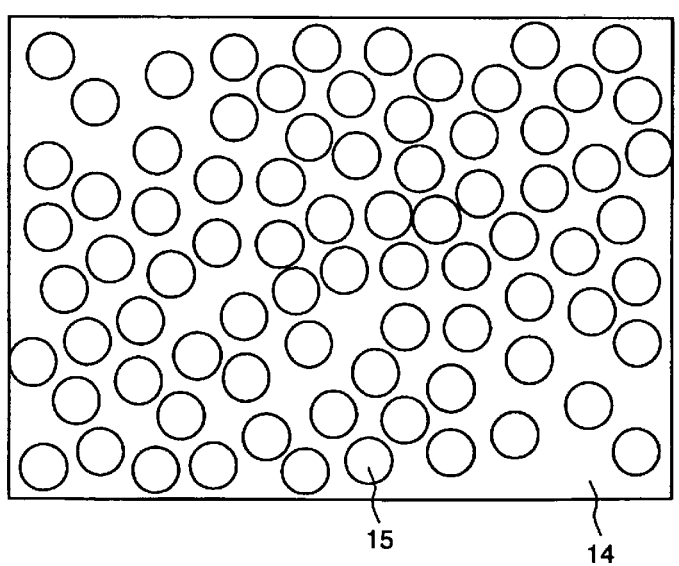
FIG. 9 is a schematic view of a transmission microscopic image of a mixed thin film of an amorphous alloy and an oxide glass component.

FIG. 9 is a schematic view of a transmission electron micrograph of Sample No. 12. The fine particles of the Co—Cr—Zr amorphous alloy 15 are dispersed in the glass matrix 14. As shown in the drawing, the amorphous alloy and the oxide thin film do not uniformly mix with one another but the amorphous alloy 15 constitutes the fine particles inside the glass matrix and are dispersed inside the matrix.

It can thus be understood that these thin films have a granular structure in which the metal fine particles are dispersed in the glass matrix. Extremely fine particles below 1 nm shown in FIG. 8 constitute the metal particles so dispersed.

Samples Nos. 29 to 23 in Table 2 show the result of the similar investigation for other thin films.

In this embodiment, the crystalline metal thin films of Al, Si and Cr and cobalt oxide thin films of CoO and $Co_3O_4$ are examined. In the crystalline metal thin films of Al, Si and Cr, the refractive index hardly changes even when the wavelength of the laser and its intensity are changed, and the change ratio is about 0.001 that is about 1/100 of that of the amorphous metal thin films. The change ratio is also small in the CoO thin film and is about 0.001. The change ratio of about 0.09 to about 0.1 can be acquired in the $Co_3O_4$ thin film but is smaller than that of the Co—Cr—Zr thin film.

[Embodiment 2]

Next, the composition range of the amorphous alloy thin films according to an embodiment of the invention is examined. Table 3 represents the examples of the alloy thin film samples.

curve with respect to the magnetic field applied to the sample, the sample is found as ferromagnetic. Such samples are described as having "ferromagnetism". When magnetization of the samples changes linearly with respect to the impressed magnetic field, such samples are described as having "paramagnetism".

A laser beam having a wavelength of 650 nm is irradiated to these samples and the reflection factor of each sample is determined. The laser has low laser intensity of 0.1 mW. An optical detector measures power of reflected light at this time, and the ratio to intensity of incident light is defined as the reflection factor.

First, Co and Ni concentrations are respectively changed in the Co—Cr—Zr alloys of Samples Nos. 24 to 27 and in

TABLE 3

| Sample No. | Alloy composition (molar ratio) | | | | | | | | | Crystal/ amorphous | Magnetism | Reflection factor |
|---|---|---|---|---|---|---|---|---|---|---|---|---|
| | Co | Ni | Cr | V | Mn | Zr | Ti | Hf | Ta | | | |
| | 0.38 | — | 0.50 | — | — | 0.12 | — | — | — | crystal | paramagnetic | 83 |
| 24 | 0.40 | — | 0.45 | — | — | 0.15 | — | — | — | amorphous | " | 91 |
| 25 | 0.60 | — | 0.30 | — | — | 0.10 | — | — | — | " | " | 90 |
| 26 | 0.70 | — | 0.25 | — | — | 0.05 | — | — | — | " | " | 92 |
| 27 | 0.75 | — | 0.20 | — | — | 0.05 | — | — | — | " | ferromagnetic | 84 |
| 28 | — | 0.38 | 0.50 | — | — | 0.12 | — | — | — | crystal | paramagnetic | 82 |
| 29 | — | 0.40 | 0.45 | — | — | 0.15 | — | — | — | amorphous | " | 90 |
| 30 | — | 0.60 | 0.30 | — | — | 0.10 | — | — | — | " | " | 91 |
| 31 | — | 0.70 | 0.25 | — | — | 0.05 | — | — | — | " | " | 92 |
| 32 | — | 0.75 | 0.20 | — | — | 0.05 | — | — | — | " | ferromagnetic | 86 |
| 33 | 0.70 | — | 0.15 | — | — | 0.15 | — | — | — | " | " | 84 |
| 34 | 0.65 | — | 0.20 | — | — | 0.15 | — | — | — | " | paramagnetic | 91 |
| 35 | 0.40 | — | 0.50 | — | — | 0.10 | — | — | — | " | " | 92 |
| 36 | 0.40 | — | 0.55 | — | — | 0.05 | — | — | — | crystal | " | 81 |
| 37 | 0.70 | — | — | 0.14 | — | 0.16 | — | — | — | amorphous | ferromagnetic | 83 |
| 38 | 0.65 | — | — | 0.20 | — | 0.15 | — | — | — | " | paramagnetic | 92 |
| 39 | 0.60 | — | — | 0.30 | — | 0.10 | — | — | — | " | " | 91 |
| 40 | 0.40 | — | — | 0.50 | — | 0.10 | — | — | — | " | " | 93 |
| 41 | 0.40 | — | — | 0.53 | — | 0.07 | — | — | — | crystal | " | 82 |
| 42 | 0.70 | — | — | — | 0.15 | 0.15 | — | — | — | amorphous | ferromagnetic | 81 |
| 43 | 0.65 | — | — | — | 0.20 | 0.15 | — | — | — | " | paramagnetic | 91 |
| 44 | 0.60 | — | — | — | 0.30 | 0.10 | — | — | — | " | " | 92 |
| 45 | 0.40 | — | — | — | 0.50 | 0.10 | — | — | — | " | " | 90 |
| 46 | 0.40 | — | — | — | 0.55 | 0.05 | — | — | — | crystal | " | 85 |
| 47 | 0.67 | — | 0.30 | — | — | 0.03 | — | — | — | " | " | 84 |
| 48 | 0.66 | — | 0.30 | — | — | 0.04 | — | — | — | amorphous | paramagnetic | 91 |
| 49 | 0.60 | — | 0.30 | — | — | 0.10 | — | — | — | " | " | 90 |
| 50 | 0.55 | — | 0.25 | — | — | 0.20 | — | — | — | " | " | 89 |
| 51 | 0.53 | — | 0.25 | — | — | 0.22 | — | — | — | crystal | " | 84 |
| 52 | 0.68 | — | 0.30 | — | — | — | 0.02 | — | — | " | " | 82 |
| 53 | 0.66 | — | 0.30 | — | — | — | 0.04 | — | — | amorphous | " | 91 |
| 54 | 0.60 | — | 0.30 | — | — | — | 0.10 | — | — | " | " | 94 |
| 55 | 0.55 | — | 0.25 | — | — | — | 0.20 | — | — | " | " | 93 |
| 56 | 0.53 | — | 0.25 | — | — | — | 0.22 | — | — | crystal | " | 84 |
| 57 | 0.67 | — | 0.30 | — | — | — | — | 0.03 | — | " | " | 82 |
| 58 | 0.66 | — | 0.30 | — | — | — | — | 0.04 | — | amorphous | " | 90 |
| 59 | 0.60 | — | 0.30 | — | — | — | — | 0.10 | — | " | " | 91 |
| 60 | 0.55 | — | 0.25 | — | — | — | — | 0.20 | — | " | " | 92 |
| 61 | 0.53 | — | 0.25 | — | — | — | — | 0.22 | — | crystal | " | 85 |
| 62 | — | 0.72 | — | — | — | — | — | — | 0.28 | amorphous | ferromagnetic | 83 |
| 63 | — | 0.70 | — | — | — | — | — | — | 0.30 | " | paramagnetic | 91 |
| 64 | — | 0.60 | — | — | — | — | — | — | 0.40 | " | " | 90 |
| 65 | — | 0.40 | — | — | — | — | — | — | 0.60 | " | " | 92 |
| 66 | — | 0.38 | — | — | — | — | — | — | 0.62 | crystal | " | 82 |

Each alloy composition in Table 3 is a target composition and is expressed by a molar ratio. The crystalline state of these thin films is evaluated by X-ray diffraction. The thin films are defined as being crystalline when a peak representing the existence of the crystal is observed, and as being amorphous when only a broad peak is observed and the crystal does not exist.

A vibration sample magnetometer is used to measure magnetic characteristics of each of the resulting thin films. When magnetization of the sample describes a hysteresis Samples Nos. 28 to 32. As to the Co—Cr—Zr alloy, a clear peak of crystallization can be observed in Sample No. 23 having a Co content of 0.38, and this sample is found as being amorphous. Magnetism is paramagnetism in this case but the reflection factor is as low as 83%. Therefore, this sample undesirably has a large loss when applied to devices such as an optical disk and an optical switch.

On the other hand, Sample No. 27 having a Co content of 0.75 is amorphous. However, because its Co content is great, magnetism describes the hysteresis curve and the sample is found ferromagnetic. Since this magnetization invites the optical Kerr effect, reflected light becomes in this case polarized light. Power of reflected light drops with the former and its value is 82%. Samples Nos. 24 to 26 each having a Co content of 0.40 to 0.70 has a reflection factor of at least 90% and exhibits a satisfactory result.

Similarly, Samples Nos. 28 to 32 as the Ni—Cr—Zr alloys have reflection factors of at least 90% and provide satisfactory results when the Ni content is from 0.4 to 0.7. When the Ni content is less than 0.4 and when it exceeds 0.7, however, the reflection factor is less than 90% due to crystallization and ferromagnetism.

The results given above reveal that the Co and Ni contents are preferably within the range of 0.4 to 0.7. When the Co and Ni contents are leas than 0.4, the film is crystallized and its reflection factor undesirably drops. When the Co and Ni contents exceed 0.7, on the other hand, the reflection factor likewise drops and the result is not satisfactory, either.

Next, Samples Nos. 33 to 36 are fabricated to examine the Cr concentration in the Co—Cr—Zr alloys. Sample No. 33 having a Cr concentration of 0.15 is ferromagnetic and the reflection factor is as low as 84% in this case. A clear peak of crystallization can be observed by X-ray diffraction in Sample No. 36 having a Cr concentration of 0.36. The reflection factor is 81% at this time and is not satisfactory. Samples having Cr concentration of 0.20 and 0.50 are amorphous and paramagnetic. The reflection factor is at least 90% at this time and a satisfactory result can be acquired.

Further, similar examination is made while V and Mn are respectively used to replace Cr 6(Samples Nos. 37 to 46). When the Mn content is 0.20 to 0.50, crystallization and ferromagnetism cannot be observed in the same way as in the case of Cr and alloy thin films having a satisfactory reflection factor can be acquired. When these contents are less than 0.20, the crystal precipitates and when they exceed 0.50, the samples become ferromagnetic with the result that the reflection factor is less than 90% and satisfactory results cannot be acquired.

The results given above reveal that Cr, V and Mn contents are preferably from 0.2 to 0.50. When these contents are less than 0.20, crystallization develops and the reflection factor undesirably drops. When the contents exceed 0.50, the thin films become ferromagnetic and the reflection factor undesirably drops.

Further, the Zr concentration of the Co—Cr—Zr alloys is changed to examine its influences. In Samples Nos. 47 and 51 respectively having the Zr concentrations of 0.03 and 0.22, precipitation of the crystal is observed and at the same time, the reflection factor is low and is not satisfactory. Samples Nos. 48 to 50 having the Zr contents of 0.04 to 0.20 are amorphous and paramagnetic. These samples have satisfactorily high reflection factors.

Similarly, when Ti and Hf are used to replace Zr and to examine their concentrations, a satisfactory composition range where crystallization does not occur exists in the same way as Zr.

The results given above reveal that the Zr, Ti and Hf concentrations are preferably from 0.04 to 0.20. When the concentrations are less than 0.04 or exceed 0.20, the crystal precipitates and the reflection factor undesirably drops with precipitation of the crystal.

The examination is similarly made for the composition range of the Ni—Ta binary amorphous alloy. Sample No. 62 having a Ta content of 0.28 is ferromagnetic. Sample No. 66 having a Ta content of 0.62 is crystallized and the reflection factor drops. Such crystallization and ferromagnetism are not observed in Samples Nos. 63 to 65 having Ta contents of 0.30 to 0.60 and high reflection factors can be acquired. These results reveal that the Ta content is preferably 0.30 to 0.60.

[Embodiment 3]

Figure 1:
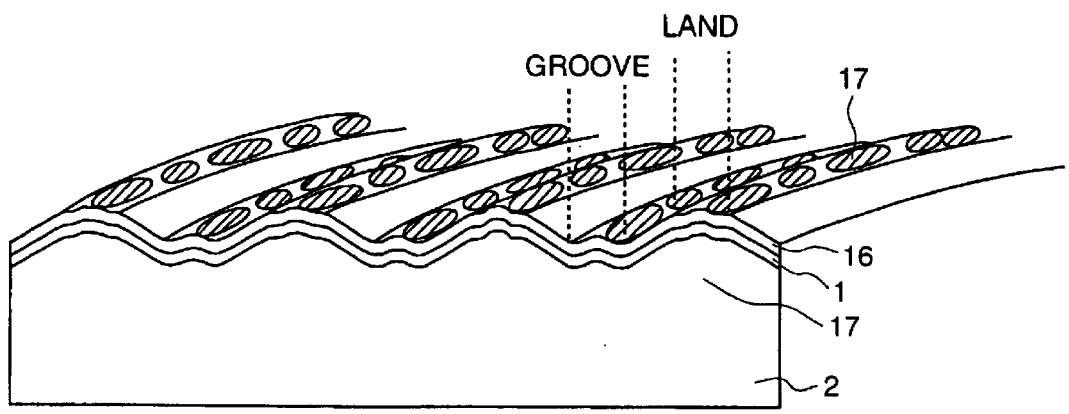
FIG. 1 is a schematic sectional view of a ROM disk according to an embodiment of the invention.
Figure 1:

FIG. 1 is a schematic sectional view of a ROM disk according to this embodiment. In the drawing, reference numeral 1 denotes a reflection film formed of the nonlinear optical thin film according to the invention. Reference numeral 2 denotes a substrate. Reference numeral 16 denotes a $SiO_2$ protective film and reference numeral 17 denotes a pit written with information.

Polycarbonate, polyolefin or glass is used as the substrate 2 depending on the specification and this embodiment uses the polycarbonate substrate. Tracking is achieved by a land-groove structure as shown in FIG. 1, and information is written to each track. The reflection film formed of the nonlinear optical thin film 1 according to the invention will be hereinafter called a "super-resolution reflection film".

The ROM disk is produced in accordance with the following process steps. First, a pit pattern having information is formed on a photoresist by using laser. The pit pattern is then transferred to a Ni mold and polycarbonate is injection-molded to this mold to form the substrate. After the $SiO_2$ protective film is formed to a thickness of 140 nm on this substrate, the super-resolution reflection film 1 is formed to a thickness of 100 nm. The substrate 2 is 0.6 mm thick. In this embodiment, two substrates on which the films are formed are bonded with the reflection films facing back by using a UV-curing resin to give a 1.2 mm thick ROM disk. The super-resolution reflection film 1 is 100 nm thick.

In this embodiment, the composition of the super-resolution reflection film 1 is changed to evaluate super-resolution performance. A ROM disk having aluminum (Al) as the reflection film 1 is fabricated as a comparative example.

Figure 10:
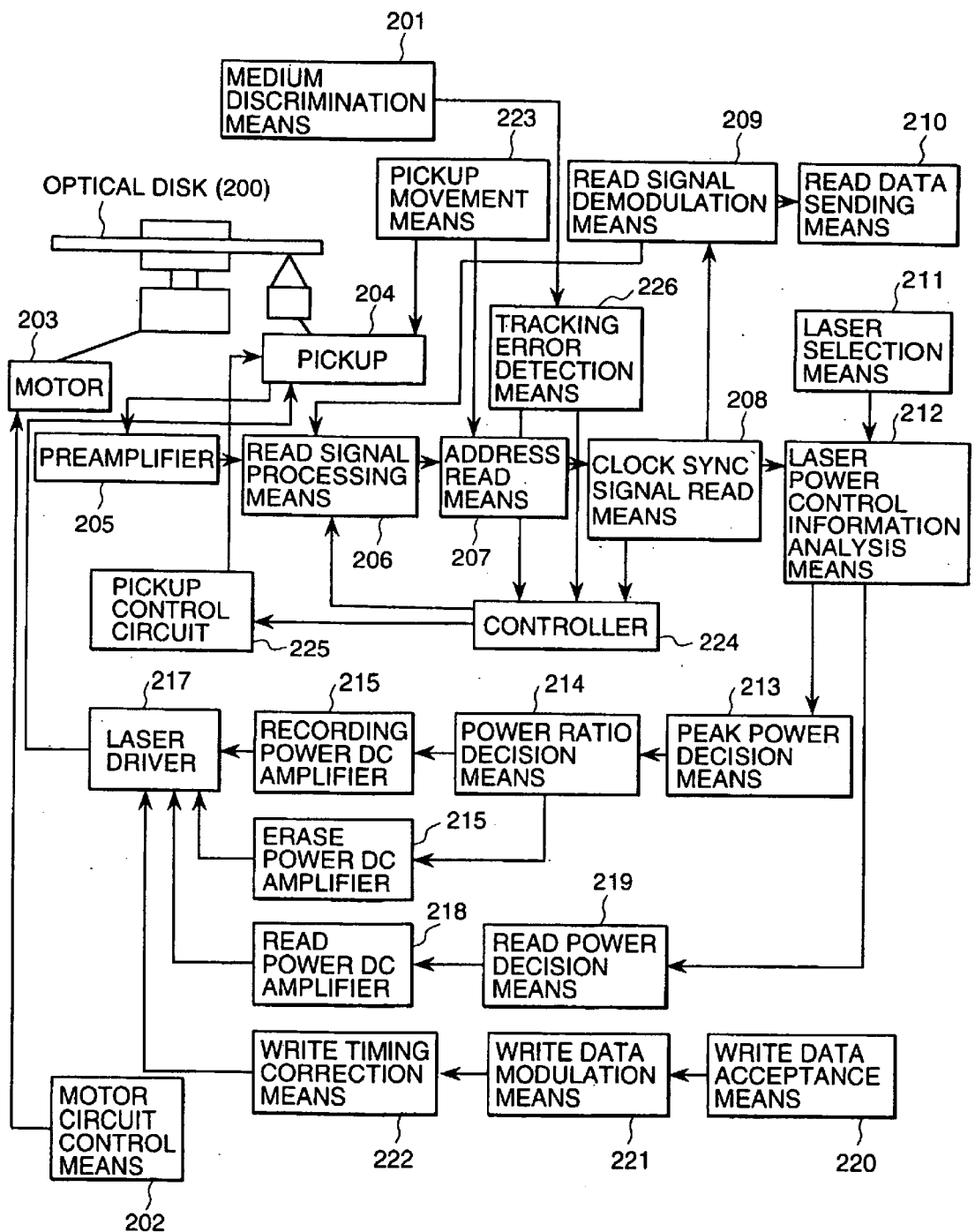
FIG. 10 is a block diagram showing a construction of an optical disk reproduction apparatus according to an embodiment of the invention.

FIG. 10 is a block diagram showing a construction of an optical information recording/reproduction apparatus used in this embodiment. The apparatus includes medium discrimination means 201 for discriminating the kind of optical disks 200 as an optical recording medium. The optical disk is temporarily fixed to a rotation mechanism connected either directly or indirectly to a spindle of a motor 203 that is controlled by motor circuit control means 202. An optical detector for detecting laser as a light source inside a pickup 204 and reflected light reads information of the optical disk as optical signals. Information is recorded to the optical disk by using the light source inside the pickup. Further, the pickup 204 is positioned in the direction of tracks by a pickup movement means 223.

The optical signals pass through a pre-amplifier 205, read signal processing means 206, address read means 207 and clock sync signal read means 208, and are outputted outside by read data sending means 210 through read signal demodulation means 209. Predetermined output means such as a display or a speaker outputs the reproduced data, or a data processing unit such as a personal computer processes the read data.

This embodiment includes laser selection means 211 capable of selecting an arbitrary laser wavelength besides a circuit system used for ordinary write and read operations. Peak power decision means 213 decides peak power used on the basis of the output of the laser selection means 211 and on the basis of analysis of laser power control information analysis means 212.

The output of the peak power decision means 213 is inputted to a laser driver 217 through power ratio decision means 214, a recording power DC amplifier 215 and an erase power DC amplifier 216 and controls the light source inside the pickup 204. Similarly, the output of read power decision means 219 is inputted to the laser driver 217 and controls the light source inside the pickup 204. A semiconductor laser having wavelength of 650 nm and 405 nm is mounted as a practical laser.

Since a focus and a focal depth vary depending on the wavelength, the apparatus used in this embodiment has a construction capable of auto-focusing mechanism with selection of the laser. A super-resolution film is formed on a disk. Tracking error detection means 226 for a high density write operation is separately disposed so as to cope with a reducing tracking width and tracking can be made in accordance with the medium used. Information form the tracking error detection means 226 is sent to the pickup 24 through a controller 224 and a pickup control circuit 225. A medium kind discrimination mechanism utilizing a difference of reflection factors of media is disposed so that tracking can be automatically made in accordance with the kind of the medium.

When data is written, write data acceptance means 220 inputs the write data and write data modulation means 221 executes data modulation. The data so modulated is inputted to the laser driver through write timing correction means 222 and controls the light source inside the pickup.

When the construction shown in FIG. 10 is employed, it becomes possible not only to compatibly use the optical recording media having different wavelengths but also to handle those disks having different write capacities to cope with greater capacity by one apparatus. Incidentally, the construction of the optical information recording/reproduction apparatus may be appropriately modified in accordance with its object and application.

The relation between the reflection factor of the super-resolution reflection film of the ROM optical disk so produced and a C/N ratio (carrier-to-noise ratio) is first examined.

Write pits of 0.50 μm are formed. A ratio of the difference of the reflection factors (carrier: C) between the written portion and the non-written portion to electrical noise and noise (N) resulting from laser, detector, etc is determined as the C/N ratio.

Figure 11:
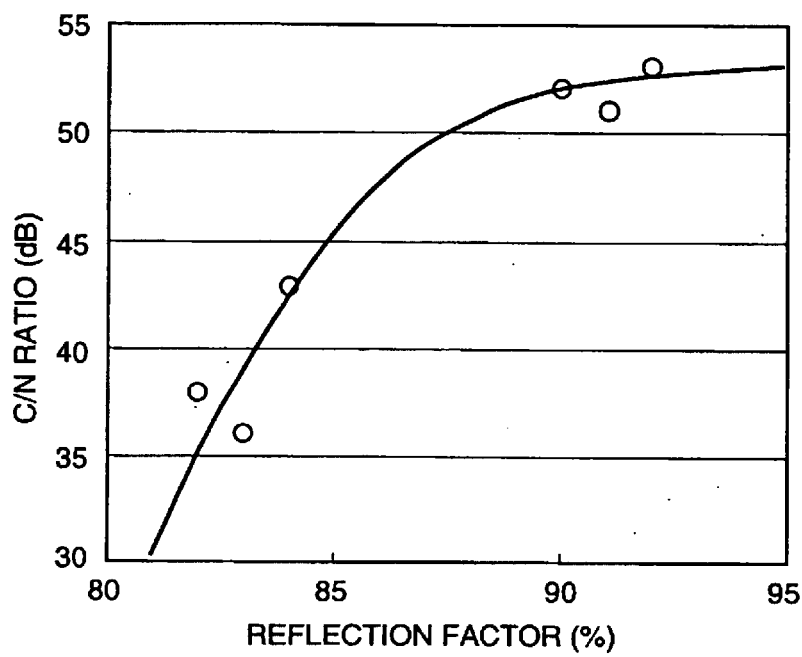
FIG. 11 is a graph showing a C/N ratio of a super-resolution reflection film of an optical disk according to an embodiment of the invention to a reflection factor.

The super-resolution film uses the reflection films of Samples Nos. 24 to 28 shown in Table 3 and the change of the C/N ratio to the reflection factor is examined. Table 4 and FIG. 11 represent the relation between the reflection factor of each reflection film and the C/N ratio. Each reflection film has a film thickness of 100 nm.

TABLE 4

| Sample No. | Alloy composition (mol %) | | | | | | | | | Reflection factor | C/N ratio |
|---|---|---|---|---|---|---|---|---|---|---|---|
| | Co | Ni | Cr | V | Mn | Zr | Ti | Hf | Ta | | |
|  | 0.38 | — | 0.50 | — | — | 0.12 | — | — | — | 83 | 36 |
| 24 | 0.40 | — | 0.45 | — | — | 0.15 | — | — | — | 91 | 51 |
| 25 | 0.60 | — | 0.30 | — | — | 0.10 | — | — | — | 90 | 52 |
| 26 | 0.70 | — | 0.25 | — | — | 0.05 | — | — | — | 92 | 53 |
| 27 | 0.75 | — | 0.20 | — | — | 0.05 | — | — | — | 84 | 43 |
| 28 | — | 0.38 | 0.50 | — | — | 0.12 | — | — | — | 82 | 38 |

When the reflection factor and the C/N ratio are plotted as in FIG. 11, it is when the reflection factor is at least 87% that an excellent C/N ratio exceeding 50 dB can be obtained. A high C/N ratio can be acquired when the reflection factor of the super-resolution reflection film is above 87% and remains substantially constant. When the reflection factor is below 87%, the thin film absorbs signal light and the C/N ratio is below 50 dB. This result reveals that the reflection factor of the super-resolution reflection film to be used as the reflection film is preferably at least 87%.

Figure 12:
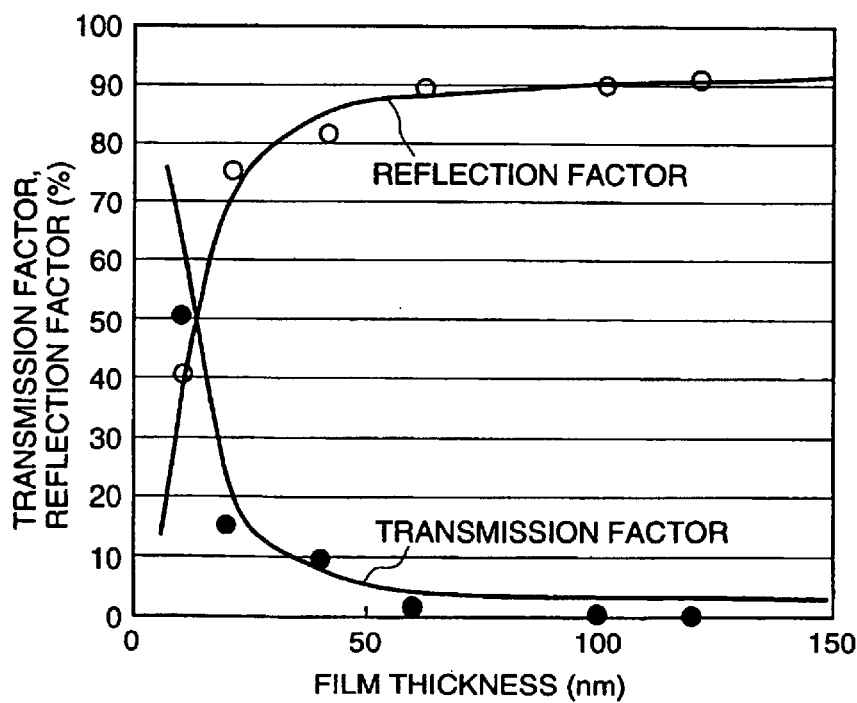
FIG. 12 is a graph showing changes of a transmission factor and a reflection factor to a film thickness of a super-resolution reflection film according to an embodiment of the invention.

Further, the relation between the film thickness of this super-resolution reflection film and the reflection factor is examined. Table 5 and FIG. 12 show the relation of the film thickness of the super-resolution reflection film with the reflection factor and the transmission factor. This embodiment uses Sample No. 25 in Table 3 as the super-resolution reflection film. The laser used has a wavelength of 650 nm and intensity of 0.1 mW. The linear velocity of disk rotation is 7 m/sec.

TABLE 5

| Sample No. | Film thickness (nm) | Reflection factor | Transmission factor |
|---|---|---|---|
| 25 | 10 | 40 | 50 |
|  | 20 | 75 | 15 |
|  | 40 | 81 | 9 |
|  | 60 | 89 | 1 |
|  | 100 | 90 | 0 |
|  | 120 | 91 | 0 |

When the film thickness is as large as about 100 nm, the transmission factor of the thin film is below the detection limit and can be judged as 0. When the film thickness reaches about 50 nm, the transmission factor starts rising and is 9% at 40 nm and about 15% at 20 nm. On the contrary, the reflection factor drops with the decrease of the film thickness and is 81% at 40 nm and 75% at 20 nm.

It can be understood from the curve shown in FIG. 12 that the film thickness providing the reflection factor of 87%, that in turn provides the excellent C/N ratio examined above, is 50 nm. Since the sum of the reflection factor and the transmission factor is about 90% in all cases, the remaining 10% is presumably occupied by the irregular reflection component or absorption by the film. Therefore, when the film thickness of the super-resolution reflection film is at least 50 nm, the transmitted light component does not exist and the rays of light can be reflected highly efficiently. When the film thickness is below 50 nm, however, the reflection factor is below 87% with the result of the drop of the C/N ratio.

It can also be understood from FIG. 12, on the other hand, that even when the film thickness increases beyond 100 nm, the resulting reflection factor cannot be improved any more. Therefore, the increase of the film thickness beyond this level elongates the process time and invites the increase of the cost. In conclusion, the film thickness of the super-resolution reflection film is preferably 50 to 100 nm.

Next, Table 6 shows reproduction output characteristics of low and high frequency components (2 MHz and 10 MHz) when the super-resolution reflection film has the composition shown in Table 6 at read power of 1, 2, 3 and 4 mW. The existence/absence of a super-resolution effect judged from this table is also shown.

Here, the term "super-resolution effect" means the phenomenon in which write pits below a diffraction limit determined by the wavelength of light can be read out at a high output. A laser beam used for reading is a semiconductor laser having a wavelength of 405 nm.

TABLE 6

| | No. | reflection film component | output (dB) 2 MHz | | | | output (dB) 10 MHz | | | | change ratio of refractive index $|n_1 - n_o|/n_o$ | super-resolution effect |
|---|---|---|---|---|---|---|---|---|---|---|---|---|
| | | | 1 mW | 2 mW | 3 mW | 4 mW | 1 mW | 2 mW | 3 mW | 4 mW | | |
| Embodiments | 1 | $Co_{0.6}Cr_{0.3}Zr_{0.1}$ | 34 | 35 | 35 | 33 | 22 | 23 | 25 | 28 | 0.533 | ◎ |
| | 2 | $Ni_{0.6}Cr_{0.3}Zr_{0.1}$ | 38 | 40 | 41 | 40 | 12 | 14 | 17 | 21 | 0.287 | ○ |
| | 3 | $Co_{0.6}Cr_{0.3}Hf_{0.1}$ | 35 | 36 | 36 | 37 | 21 | 23 | 23 | 28 | 0.400 | ◎ |
| | 4 | $Co_{0.6}Cr_{0.3}Ti_{0.1}$ | 43 | 44 | 45 | 47 | 15 | 17 | 21 | 22 | 0.389 | ○ |
| | 5 | $Ni_{0.6}Cr_{0.3}Hf_{0.1}$ | 39 | 40 | 45 | 42 | 14 | 18 | 20 | 21 | 0.298 | ○ |
| | 6 | $Ni_{0.6}Cr_{0.3}Ti_{0.1}$ | 38 | 35 | 38 | 40 | 15 | 18 | 20 | 21 | 0.315 | ○ |
| | 7 | $0.95(Co_{0.6}Cr_{0.3}Zr_{0.1})$-$0.05SiO_2$ | 38 | 38 | 39 | 38 | 14 | 16 | 18 | 20 | 0.396 | ○ |
| | 8 | $0.90(Co_{0.6}Cr_{0.3}Zr_{0.1})$-$0.10SiO_2$ | 36 | 39 | 32 | 37 | 13 | 15 | 16 | 19 | 0.206 | ○ |
| | 9 | $0.90(Co_{0.6}Cr_{0.3}Zr_{0.1})$-$0.10(SiO_2TiO_2)$ | 37 | 38 | 38 | 39 | 15 | 17 | 19 | 21 | 0.250 | ○ |
| | 10 | $0.90(Co_{0.6}Cr_{0.3}Zr_{0.1})$-$0.10(SiO_2$—$Na_2O$—$CaO)$ | 38 | 39 | 41 | 40 | 14 | 16 | 18 | 22 | 0.227 | ○ |
| | 11 | $0.90(Co_{0.6}Cr_{0.3}Zr_{0.1})$-$0.10(SiO_2$—$B_2O_3$—$Na_2O)$ | 35 | 36 | 36 | 35 | 16 | 19 | 21 | 23 | 0.204 | ○ |
| Comp. Example | 12 | $0.80(Co_{0.6}Cr_{0.3}Zr_{0.1})$-$0.20SiO_2$ | 7 | 8 | 10 | 11 | 4 | 5 | 5 | 5 | 0.090 | — |
| | 13 | $0.60(Co_{0.6}Cr_{0.3}Zr_{0.1})$-$0.40SiO_2$ | 6 | 8 | 9 | 8 | 5 | 6 | 6 | 5 | 0.039 | — |
| | 14 | Al | 37 | 36 | 35 | 37 | 1 | 2 | 2 | 2 | 0.001 | x |

A spectrum analyzer is used to analyze frequency dependence of the read output characteristics.

Figure 13:
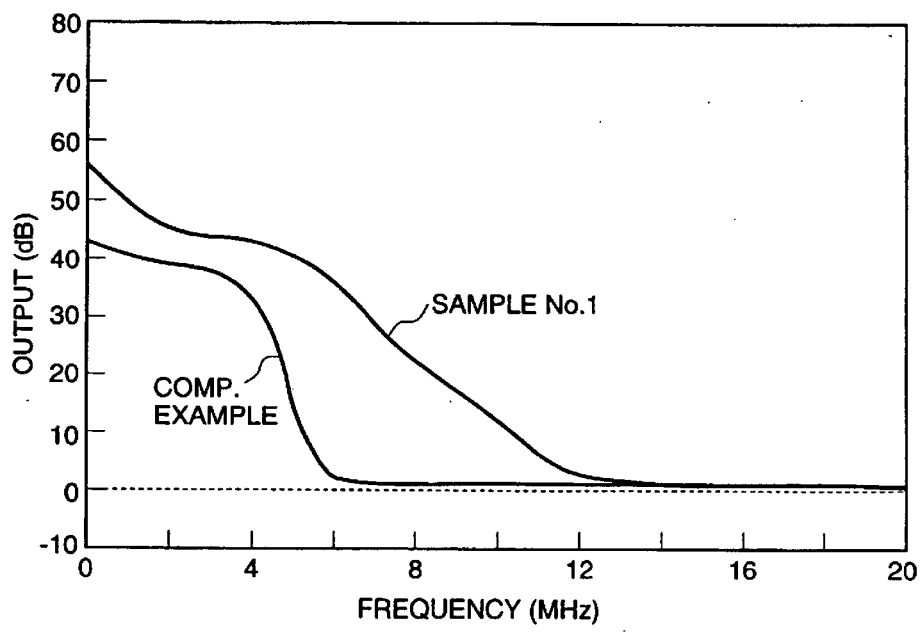
FIG. 13 is a graph showing reproduction frequency characteristics of a disk having a super-resolution thin film according to an embodiment of the invention and those of a disk having an ordinary reflection film.

FIG. 13 shows a measurement example of the read output characteristics analyzed by the spectrum analyzer. FIG. 13 shows the read output characteristics of the disk of Embodiment 1 and a disk of Comparative Example 14. The super-resolution reflection film of Embodiment 1 is the film No. 3 in Table 1. The reflection film of Comparative Example is an Al film. Read laser power is 1 mW in both cases.

It is found that when the film of Embodiment No. 1 is formed as the super-resolution reflection film, the output level is higher up to a high frequency component than in Comparative Example. The high frequency components of signals are depicted by finer pit patterns on the ROM disk. Therefore, when the super-resolution film is formed, the finer pit pattern are read and outputted. Therefore, when the super-resolution film No. 4 is formed, the super-resolution effect can be acquired. This phenomenon develops as the refractive index changes only when the laser beam is irradiated.

Figure 14:
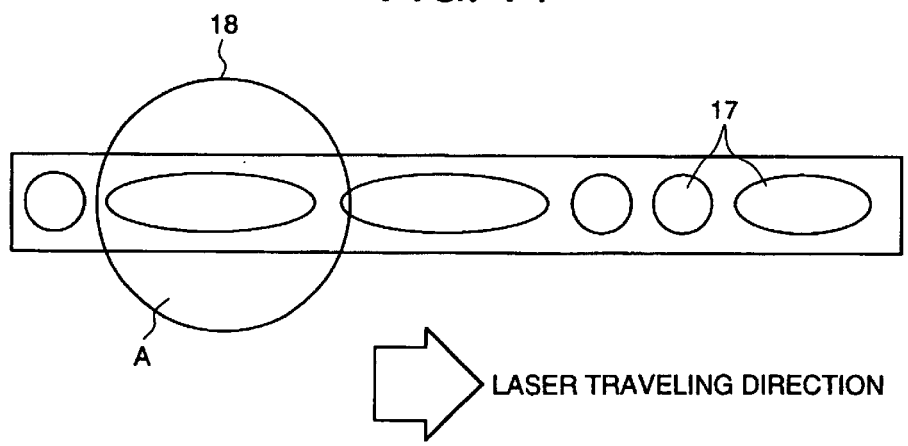
FIG. 14 is a schematic view showing a reproduction principle by ordinary laser.

The super-resolution effect by the change of the refractive index will be explained in detail with reference to FIGS. 14 and 15. In these drawings, reference numeral 17 denotes recording pits and reference numeral 18 does a laser beam. FIG. 14 shows the recording pit pattern and power of reflected laser beam during the read operation when the super-resolution reflection film does not exist and FIG. 15 shows those when it exists.

The laser travels in a direction indicated by arrow in the drawings with respect to the track. When the super-resolution reflection film doe not exist as in FIG. 14, the reflection factor remains equal throughout the laser irradiation area. Therefore, reflected light returns from the full area. Because the information of the full area of the laser is detected at once, reflected light becomes the mean of light from the pit portions and reflected light from other portions and the quantity of information from only the pits becomes small. Therefore, the difference of the reflection factors between the pit portion and other portion becomes small and a reproduction signal has a lower S/N ratio.

Figure 15:
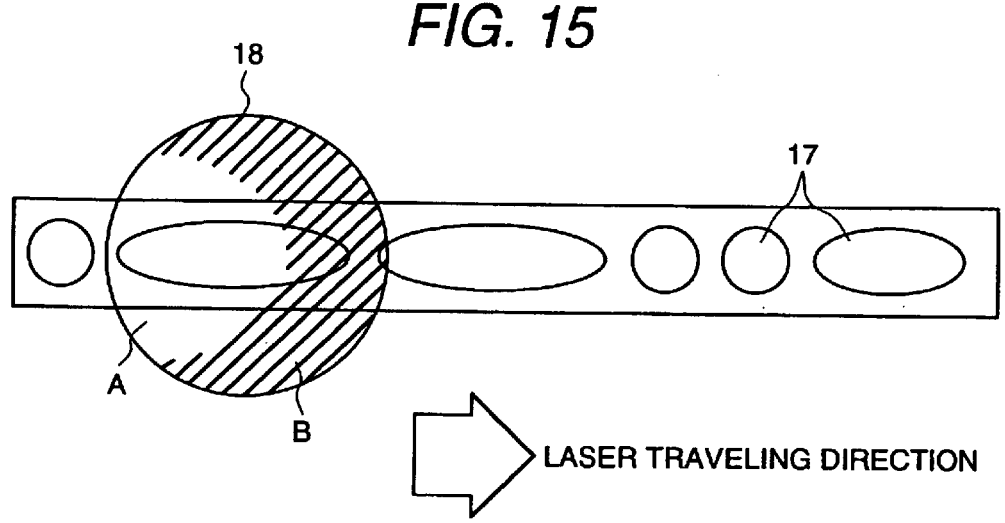
FIG. 15 is a schematic view showing a reproduction principle when a super-resolution reflection film is formed.

Next, the super-resolution image read operation shown in FIG. 15 will be examined. The reflective index of the super-resolution reflection film changes upon laser irradiation. Therefore, the portion (B in FIG. 15) ahead of the laser irradiation area is the area where the refractive index does not change because the lapse of time from laser irradiation is short.

On the other hand, the area (A in FIG. 15) at the back of the laser irradiation area is the area in which the refractive index changes because the lapse of time is long from laser irradiation. It is possible to extremely reduce the reflection factor of light under a certain refractive index condition and to therefore form a mask area through an optical design of refractive indices of reflection film and protection film and their film thickness. Let's consider the case where the reflection index is decreased while the refractive index of the reflection film remains unaltered to create a condition where light is not reflected from the area B.

When the refractive index of the reflection film changes under such a condition, the reflection factor rises because the value comes off from the optical design described above. In other words, light is reflected from only the portion (area A) in which the refractive index of the reflection film changes. Under such a condition, the area to which reflected light returns is smaller than in ordinary reproduction shown in FIG. 14. In consequence, signal light from the pit and signal light from portion other than the pit can be read out with high S/N and high contrast.

In other words, the change of the refractive index caused by laser irradiation of the super-resolution reflection film generates the super-resolution effect. As a result, the fine pits can be reproduced as shown in FIG. 13.

Judgment of the super-resolution effect in Table 6 is made in the following way. The output at each of 2 MHz and 10 MHz at each reproduction output is read out from the spectrum shown in FIG. 13. When the output at 10 MHz as a high frequency signal and at a laser beam intensity of 2 mW is 20 dB or more, the super-resolution effect is judged as ◎. When the output is from 13 dB to less than 20 dB, the super-resolution effect is judged as ○. The effect is judged as Δ from 8 dB to less than 13 dB and is X when the output is less than 8 dB. Table 6 also shows the change ratio of the refractive index $|n_1-n_o|/n_o$ of each reflection film at 405 nm.

In the $Co_{0.6}Cr_{0.3}Zr_{0.1}$ and $Co_{0.6}Cr_{0.3}Hf_{0.1}$ reflection films of Samples Nos. 1 and 3, the output at 2 mW and 10 MHz is more than 20 dB and the super-resolution effect is ⊙. It is found that the change ratio of the refractive index is 0.4 in both cases and an excellent super-resolution effect can be acquired.

In Samples Nos. 2 and 4 to 11, the output at 2 mW and 10 MHz is greater than 13 dB and less than 20 dB, and the super-resolution effect is ○. It is found that the change ratios of the refractive indices of these samples are 0.2 to less than 0.4 and the super-resolution effect is ○ within this range.

On the other hand, Comparative Example No. 14 can acquire a high output at 2 MHz. However, the output is low at 10 MHz and the super-resolution effect cannot be recognized. In Comparative Examples 12 and 13, the signals are weak at 2 MHz, and whether or not the super-resolution effect is acquired cannot be judged. For, since these films contain a large amount of glass component, the transmission factor rises and the reflection factor drops, on the contrary. In consequence, these films do not function as the reflection film.

Figure 16:
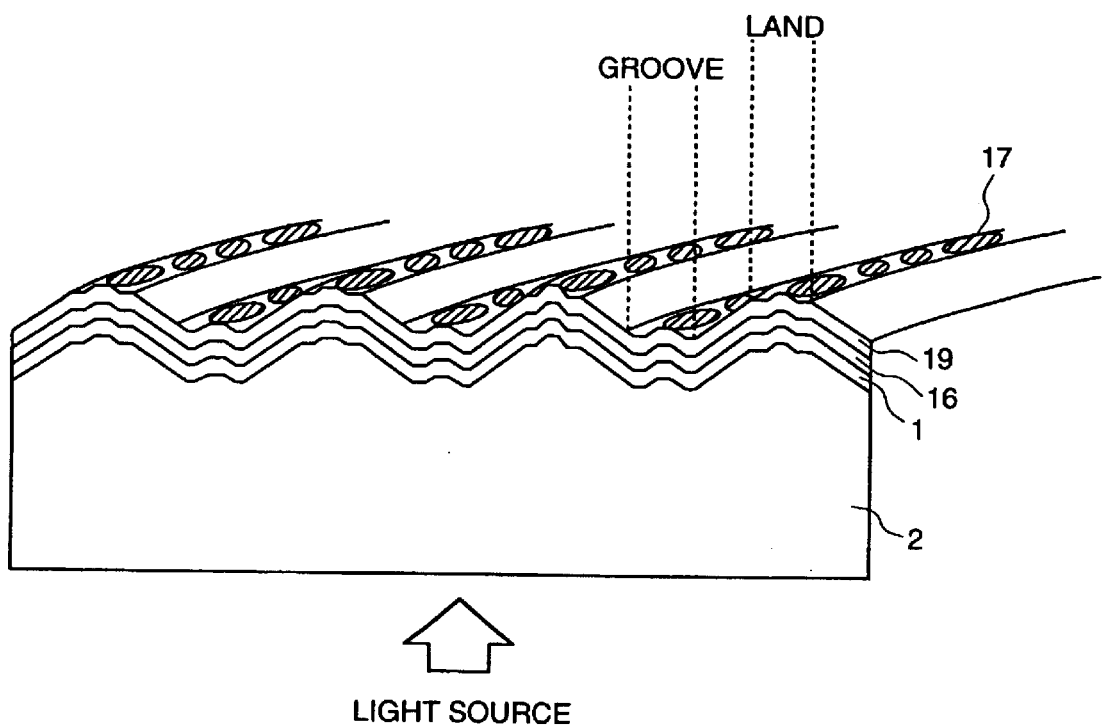
FIG. 16 is a schematic sectional view of a ROM disk according to an embodiment of the invention.

Therefore, an Al reflection film is further formed on the back of the films of Comparative Examples 12 and 13 to examine the super-resolution effect. In FIG. 16, reference numeral 1 denotes the nonlinear optical thin film. Reference numeral 2 denotes the substrate. Reference numeral 16 denotes the $SiO_2$ protective film. Reference numeral 17 denotes the recording pit and reference numeral 19 does the Al reflection film. Table 7 tabulates the examination result of the disk having this construction in the same way as in Table 6.

[Embodiment 4]

Figure 17:
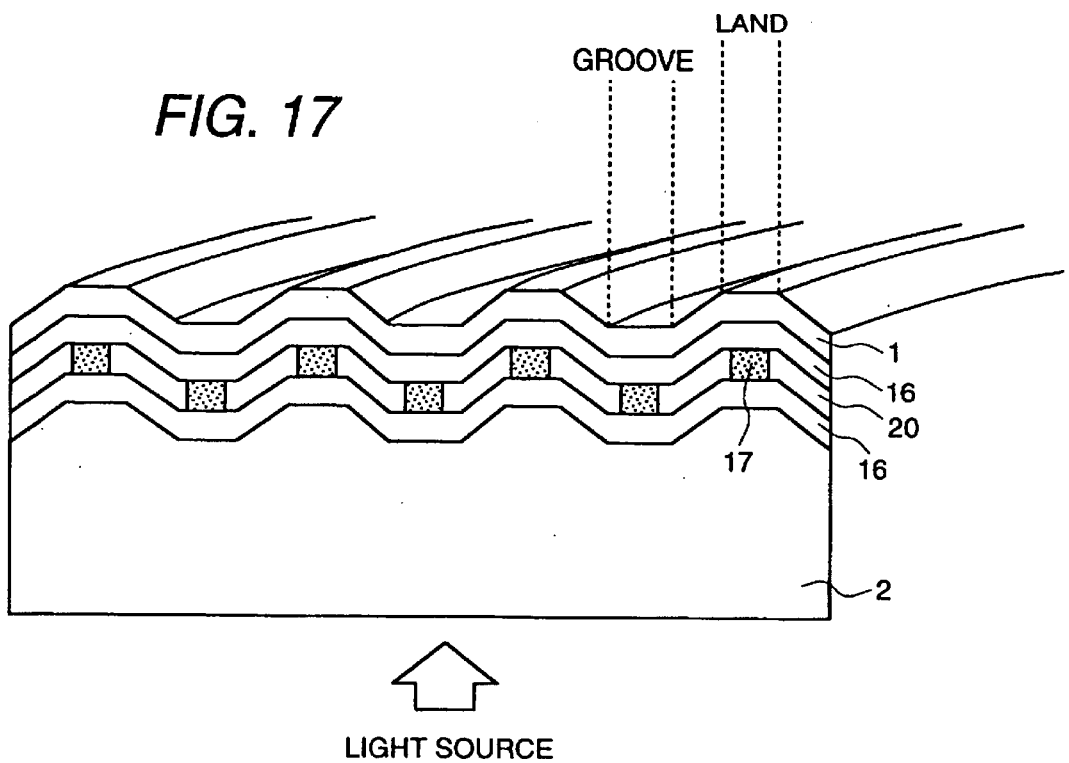
FIG. 17 is a schematic sectional view of a RAM disk according to an embodiment of the invention.

Next, a RAM (Random Access Memory) disk having the nonlinear optical thin film described above is fabricated and its characteristics are evaluated. FIG. 17 is a schematic sectional view of the RAM disk fabricated in this embodiment. In FIG. 17, reference numeral 1 denotes a super-resolution reflection film. Reference numeral 2 denotes a polycarbonate substrate. Reference numeral 20 denotes a recording film. FIG. 16 denotes a $SiO_2$ protective film. Reference numeral 17 denotes a recording pit formed on the recording film.

This embodiment uses a disc-like substrate having a land-groove structure, a thickness of 0.6 mm and a diameter of 120 mm for the polycarbonate substrate 2. A ZnS—$SiO_2$ protective film 16 is formed by sputtering to a thickness of 80 nm on the substrate 2. A Ge—Sb—Te phase change optical recording medium (recording film) is likewise formed by sputtering to a thickness of 20 nm as the recording film 20. After the protective film 16 is formed, the super-resolution reflection film 1 according to the invention is formed to a thickness of 100 nm.

When the thickness of the protective film is controlled, the overall reflection factor of the recording medium can be regulated. Two substrates each of which has this film are bonded to acquire the desired RAM disk.

This embodiment uses the thin film No. 3 in Table 1 for the super-resolution reflection film 1. A RAM disk having an Al reflection film is fabricated as comparative example.

Figure 18:
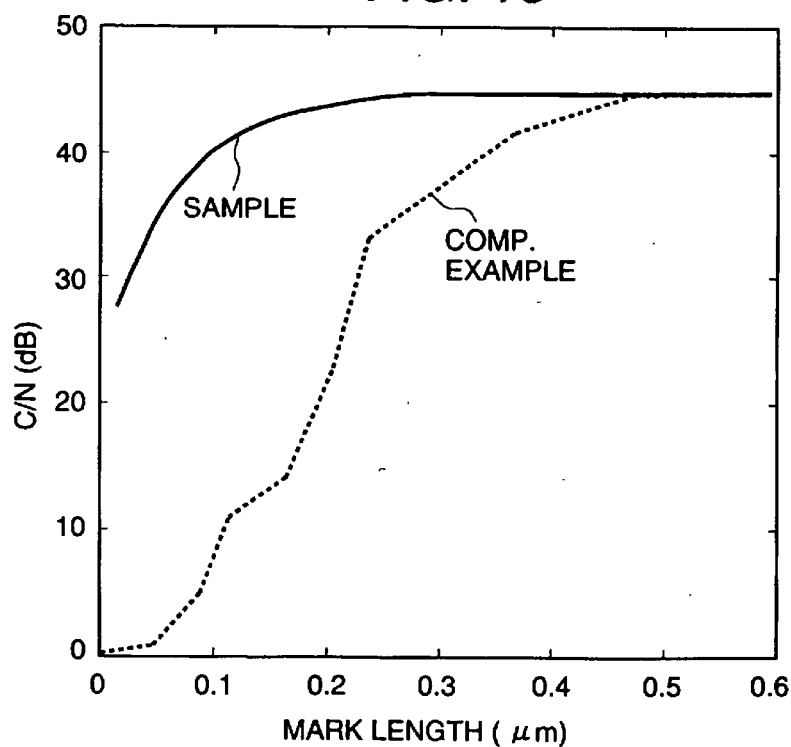
FIG. 18 is a graph showing a C/N ratio of existence/absence of a super-resolution reflection film to a mark length.

FIG. 18 shows intensity of a reproduction output relative to the length of the recording pit (mark length) of the RAM

TABLE 7

| | | reflection film | output (dB) | | | | | | | | change ratio of refractive index | super-reso-lution |
|---|---|---|---|---|---|---|---|---|---|---|---|---|
| | | | 2 MHz | | | | 10 MHz | | | | | |
| | No. | component | 1 mW | 2 mW | 3 mW | 4 mW | 1 mW | 2 mW | 3 mW | 4 mW | $|n_1 - n_0|/n_0$ | effect |
| Embodiments | 15 | $0.80(Co_{0.6}Cr_{0.3}Zr_{0.1})$-$0.20SiO_2$ | 37 | 37 | 39 | 41 | 9 | 10 | 11 | 13 | 0.090 | Δ |
| | 16 | $0.60(Co_{0.6}Cr_{0.3}Zr_{0.1})$-$0.40SiO_2$ | 36 | 37 | 39 | 40 | 8 | 9 | 9 | 10 | 0.039 | Δ |
| Comp. Example | 17 | Al | 37 | 36 | 35 | 37 | 1 | 2 | 2 | 2 | 0.001 | X |

Unlike Table 7, the reflection factor of the low frequency component of 2 MHz in these examples because the reflection film is disposed and an output of about 40 dB is acquired. An output of a high frequency component of 10 MHz is as great as at least 8 dB, and the judgment result of the super-resolution effect is Δ.

As described above, the nonlinear optical amorphous alloy thin film according to the embodiment of the invention is used as the reflection film, or the reflection film is further formed on the back of the thin film of the mixture of the amorphous alloy and oxide glass, to produce the ROM disk. As a result, the output of the high frequency component is high when the change ratio of the refractive index $|n_1-n_0|/n_0$ of this reflection film is at least 0.1, and an excellent super-resolution effect can be acquired. Further preferably, a higher output can be obtained when the change ratio of the refractive index is at least 0.2 and an extremely excellent super-resolution effect can be obtained when the change ratio is at least 0.4.

As described above, the optical information medium such as the ROM disk having the super-resolution film according to the invention can read the fine recording pits with a high sensitivity.

disk having the recording pits that are equidistantly formed to an equal shape. A laser wavelength for readout is 405 nm and laser power is 2 mW. Recording and reproduction are conducted at 1 to 2 mW and information recording is made at about 20 mW.

It is found that in the embodiment, that is, the sample No. 3 having the super-resolution reflection film, the read output is higher with respect to a shorter mark length than in the comparative example having the Al reflection film. It is found from this fact that when the super-resolution film is formed, the write operation can be made at a shorter mark length and the super-resolution effect can be confirmed for the RAM disk, too.

Additionally, when all the super-resolution reflection films in Table 1 are examined, the super-resolution effect similar to the effect described above can be confirmed. When each thin film of Samples Nos. 11, 12, 15, 16 and 17 in Table 2 is used as the super-resolution reflection film, too, a high super-resolution effect can be similarly confirmed. However, the super-resolution effect cannot be confirmed for the metal thin film of each of Samples Nos. 18, 19 and 20 in Table 2.

As to thin films having small extinction coefficients but having high transparency such as Samples Nos. 13, 14, 20 and 21 in Table 2, RAM disks are fabricated by further disposing an Al reflection film in the same way as the examination of the ROM disk of Embodiment 2, and the super-resolution effect of these films is examined.

Figure 19:
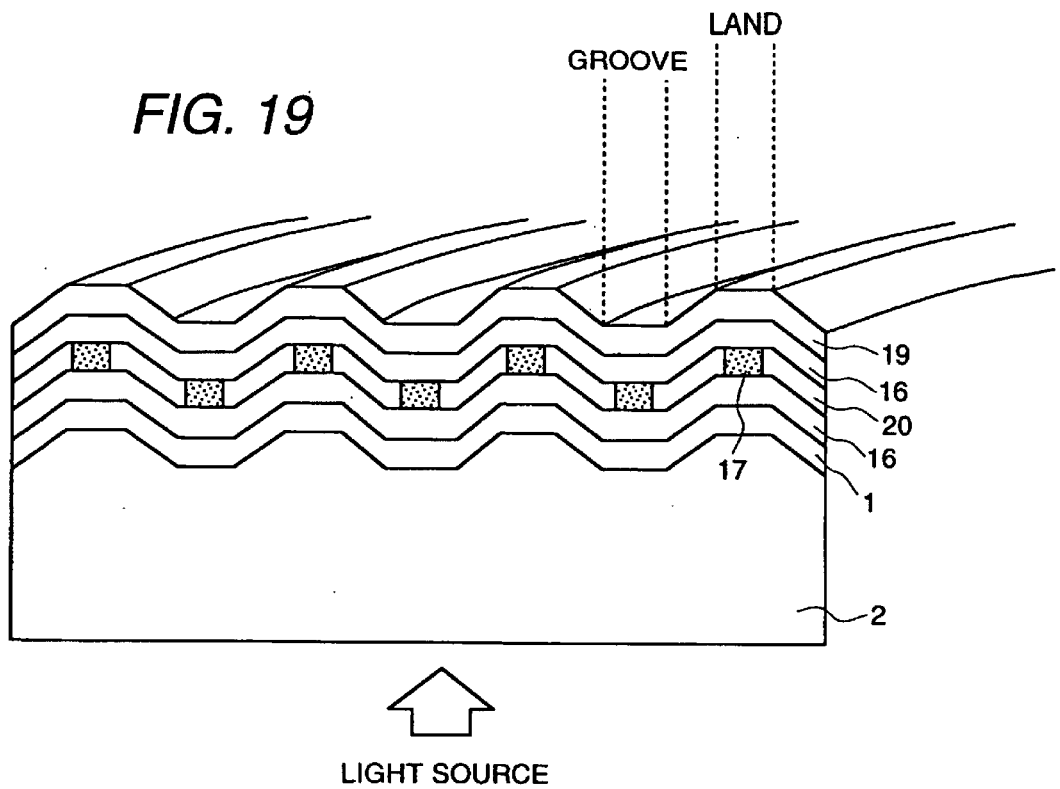
FIG. 19 is a schematic sectional view of a RAM disk according to an embodiment of the invention.

FIG. 19 is a schematic sectional view of the RAM disk so fabricated. In the drawing, reference numeral 1 denotes a nonlinear optical thin film. Reference numeral 2 denotes a polycarbonate substrate. Reference numeral 20 denotes a recording film. Reference numeral 16 denotes a $SiO_2$ protective film. Reference numeral 17 denotes recording pits formed on the recording film. Reference numeral 19 denotes an Al reflection film.

This embodiment uses a disc-like substrate having a land-groove structure, a thickness of 0.6 mm and a diameter of 120 mm for the polycarbonate substrate 2. The nonlinear optical thin film 1 is formed by sputtering to a thickness of 50 nm on the surface of the substrate 2. Next, a ZnS—$SiO_2$ protective film 16 is formed by sputtering to a thickness of 80 nm on the thin film 1. Further, a Ge—Sb—Te phase change optical recording medium (recording film) is formed by sputtering to a thickness of 20 nm as the recording film 20. After the protective film 16 is formed to a thickness of about 90 nm, the Al reflection film 19 is formed to a thickness of 100 nm. Two substrates having such films formed thereon are bonded to acquire a desired RAM disk.

A laser beam at 13 mW is irradiated to all the tracks of the RAM disk so obtained to crystallize the phase change optical recording film on the entire disk surface. This is the state where the information is not written. As the laser pulse beam is irradiated in match with the signals having the information, the information is written. The pulse beam of 20 mW that is time-wise modulated is irradiated to execute the write operation of the information.

The laser rapidly heats the phase change optical recording film at the portions where this 20 mW pulse beam is irradiated, and quenches it when the laser is removed and renders the film amorphous. The difference of the reflection factors between the original crystallized portion and the amorphous portion is utilized to write the information.

When the laser of about 13 mW is again irradiated to the amorphous portion, the information can be erased. Furthermore, when a pulse laser of 20 mW is afresh irradiated immediately after the irradiation of this 13 mW laser beam, new information can be written. The difference of the reflection factors is read by using a weak laser beam of 1 to 2 mW to read the information so written.

Figure 20:
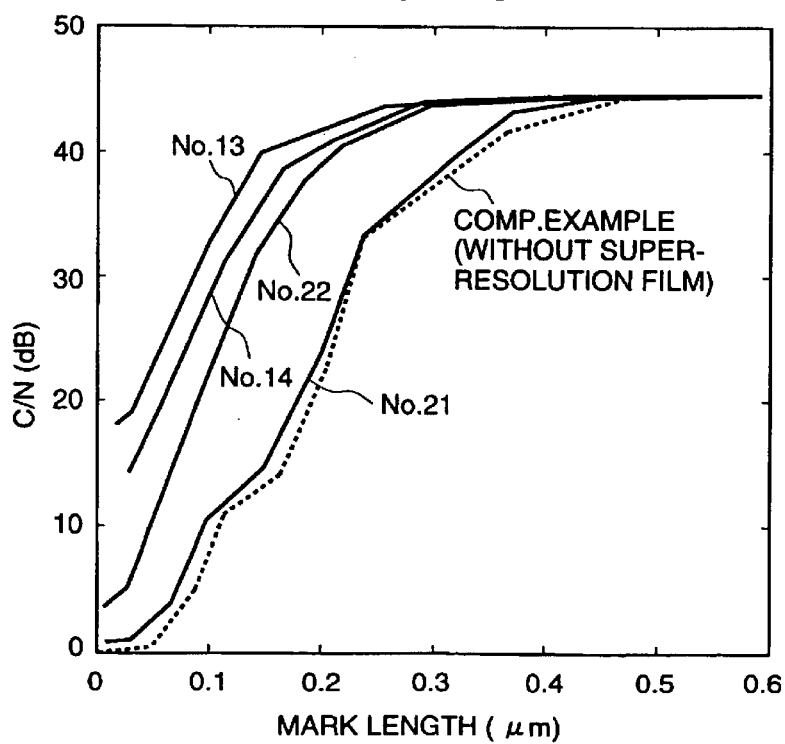
FIG. 20 is a graph showing a C/N ratio of existence/absence of a super-resolution reflection film to a mark length.

The super-resolution effects of these films are examined in the same way as the method shown in FIG. 18. FIG. 20 shows this result. The graph shows also the result of Comparative Example where the nonlinear optical thin film 1 is not formed. Comparative Example not having the super-resolution film has a small C/N ratio to the pits having a small mark length in the same way as the result shown in FIG. 18. When the CoO film No. 21 is used as the nonlinear optical thin film, the super-resolution effect can hardly be observed because the change ratio of the refractive index is small.

When the thin films Nos. 13, 14 and 22 are used, on the other hand, a high C/N ratio can be obtained for a small mark length, too, and the super-resolution effect can be observed. Incidentally, a greater super-resolution effect can be acquired when a thin film having a greater change ratio of the refractive index is used. In comparison with the case shown in FIG. 18, however, the C/N ratio to a small mark length of about 0.1 μm is smaller in these films than the super-resolution reflection film because they have a small change ratio of the refractive index.

The examination result given above reveals that the super-resolution reflection film of this embodiment can read and write the fine data. Since the change ratio of the refractive index and the super-resolution effect have correlation, energy can be saved in the super-resolution reflection film capable of reading the information in a recording density equivalent to that of the prior art devices by reducing the laser beam intensity.

[Embodiment 5]

Next, degradation of the film in the course of repetition of reproduction is examined. For evaluation, the read signal beam is repeatedly irradiated to the RAM disk shown in FIG. 17 to detect the read output. The laser wavelength is 405 nm and laser power is 2 mW. The recording mark has a mark length of 0.2 μm. The film No. 3 is used as the super-resolution reflection film. A phthalocyanine organic film is used as Comparative Example.

Figure 21:
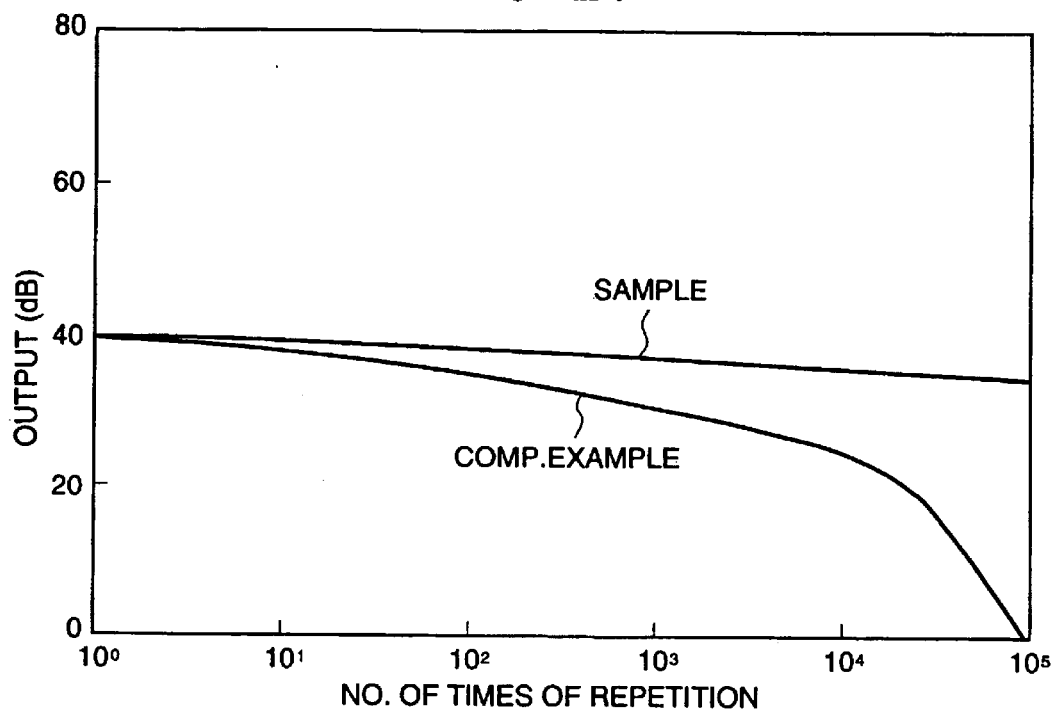
FIG. 21 is a graph showing degradation of a C/N ratio with respect to the number of repetition of reproduction operations of an optical disk according to an embodiment of the invention.

FIG. 21 is a graph showing the relation between the number of times of repetition and the output. It is found that the output gradually drops from the number of times of repetition of smaller than 10,000 times in the disk having the organic film.

On the other hand, the drop of the output can be hardly observed in the disk having the glass film according to the embodiment even at the number of times of repetition of 100,000.

As described above, it is found that the optical disk according to this embodiment keeps the super-resolution effect in the course of repetition of reproduction.

When other nonlinear optical thin films shown in Tables 1 and 2 are used, too, high stability to repetition of reproduction can be acquired. Stability to repetition of reproduction is partly and presumably because the super-resolution reflection film is made of the alloy. In other words, besides the RAM disk, the information recording media using the super-resolution reflection film according to the invention all have durability to repetition of reproduction.

Next, the response speed is examined when the super-resolution reflection film according to the embodiment. First, the RAM disk shown in FIG. 17 is fabricated. The mark length is kept constant at 0.2 μm. Read power is kept constant at 2 mW and the linear velocity of revolution is changed. The film No. 3 is used as the super-resolution reflection film.

Figure 22:
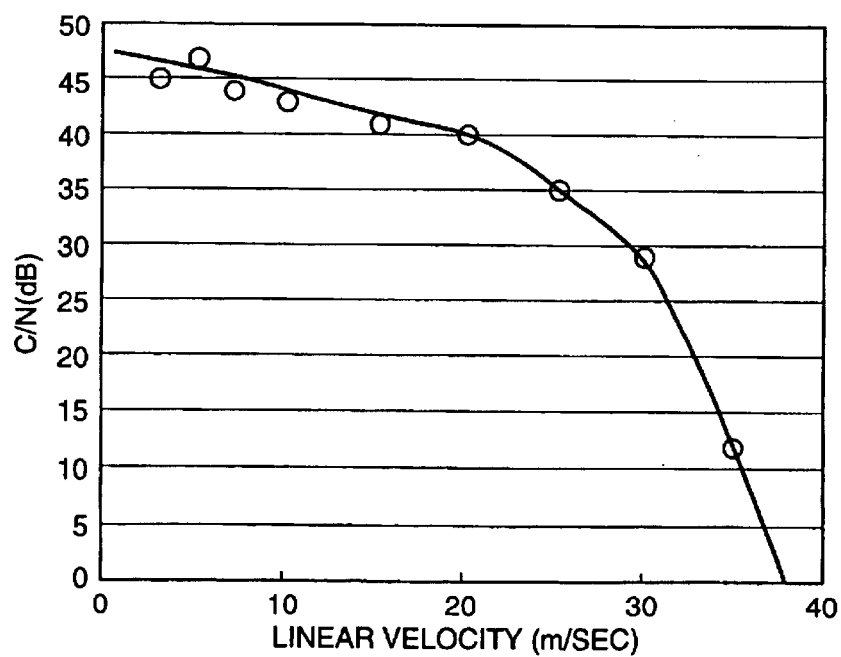
FIG. 22 is a graph showing a change of a C/N ratio to linear velocity of an optical disk having a super-resolution reflection film mounted thereon according to an embodiment of the invention.

Table 8 and FIG. 22 show the C/N ratio to the linear velocity of revolution.

TABLE 8

| Sample No. | Linear velocity (m/sec) | C/N (dB) |
|---|---|---|
| 3 | 3 | 45 |
|  | 5 | 47 |
|  | 7 | 44 |
|  | 10 | 43 |
|  | 15 | 41 |
|  | 20 | 40 |
|  | 25 | 35 |
|  | 30 | 29 |
|  | 35 | 12 |

It can be understood that when the super-resolution resolution reflection film according to the embodiment is used, the super-resolution effect can be acquired at about 20 m/sec, and a high C/N ratio can be acquired. However, it is found that the C/N ratio drops when the linear speed of revolution exceeds 20 m/sec.

The reason is presumably because the change of the refractive index of the super-resolution reflection film cannot follow the rise of the disk speed as the disk speed rises. In consequence, the difference of the reflection factor between the recorded portion and the non-recorded portion cannot be sufficiently acquired.

It is thus found that when the super-resolution reflection film according to the embodiment is used, a sufficiently high C/N ratio can be acquired at a disk rotation speed of 20 m/sec or below and the information can be read at a higher speed than the prior art devices. When the disk rotation speed exceeds 20 m/sec, however, the change ratio of the refractive index becomes small because the change of the refractive index cannot follow the speed, and a sufficient super-resolution effect cannot be easily obtained.

[Embodiment 6]

Figure 23:
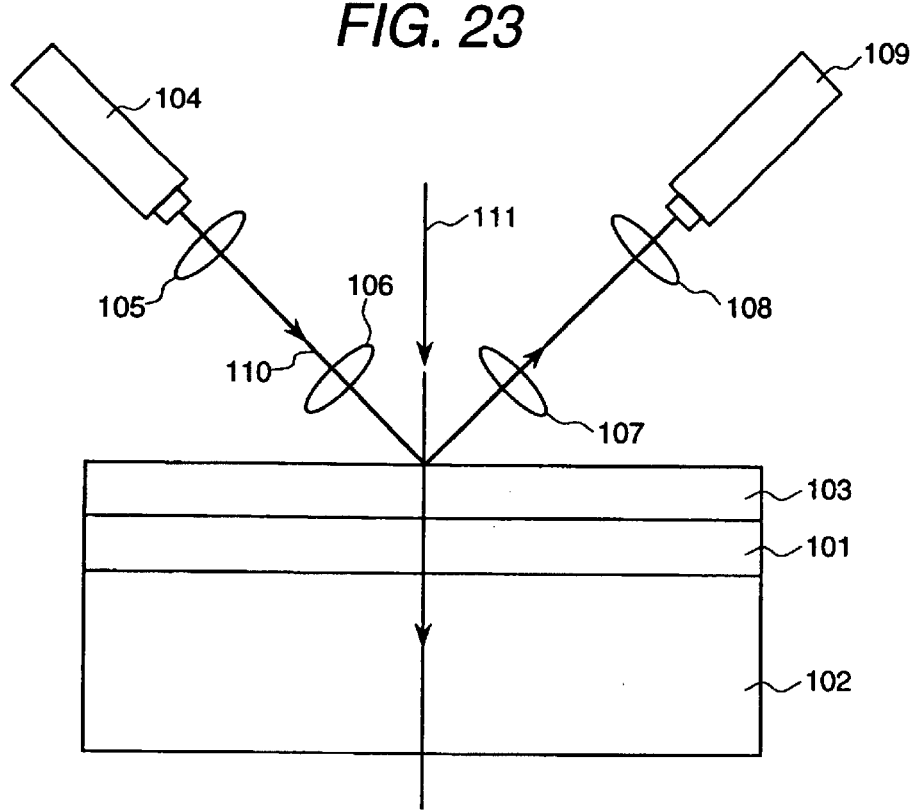
FIG. 23 is a schematic view of an optical switching device according to an embodiment of the invention.

Next, an optical switching device having the nonlinear optical thin film of the invention mounted thereto is fabricated. FIG. 23 is a schematic view of the optical switching device so fabricated. In FIG. 23, reference numeral 101 denotes a nonlinear optical thin film. Reference numeral 103 denotes a transmission factor regulation film and reference numeral 102 denotes a substrate for supporting these films.

This embodiment uses the Co—Cr—Zr thin film No 3 in Table 1 for the nonlinear optical thin film 101. This thin film has a refractive index of 2.3 at 0.1 GW/m$^2$ but the refractive index changes to about 3.6 when a strong laser beam of 5 GW/m$^2$ is irradiated. A TiO$_2$ thin film having a refractive index of 2.6 is used for the transmission factor regulation film 103. RF sputtering is employed to form this TiO$_2$ thin film in the same way as the nonlinear optical thin film 101. The target size and the film formation condition are the same as those for thee nonlinear optical thin film 101.

To drive this optical switching device, excitation light 111 is irradiated to the film surface from a vertical direction. The reflection factor of measurement light 110 is measured by turning ON and OFF this excitation light 111. Measurement light 110 is irradiated from a direction at an angle of 45 degrees from the film surface. Measurement light 110 outgoes from a light source 104, passes a collimation lens 105, is incident into a condenser lens 106, and is condensed and irradiated to the film surface. Reflected light passes a collimation lens 107 and a condenser lens 108 and is incident into a detector 109.

Excitation laser uses a semiconductor laser of 650 nm. An irradiation area to the sample is 1.5 μmϕ. Laser intensity is 5 GW/m$^2$. The wavelength of measurement light is 1,550 nm and light of 1.0 μmϕ is reflected into the area to which excitation light is irradiated.

When excitation light 111 is not irradiated, the refractive index of TiO$_2$ of the transmission factor regulation film is 2.6 and the refractive index of the nonlinear optical thin film is 2.3. The film thickness of the transmission regulation film is set to 100 nm so that the reflection factor attains maximum under this condition.

When the excitation laser beam of 5 GW/m$^2$ is irradiated under this condition, the refractive index of the nonlinear optical thin film becomes as great as 3.6. In consequence, the optical reflection condition collapses and power of reflected light of measurement light becomes substantially 0. When this laser irradiation is stopped, the refractive index again returns to 2.3 and power of reflected light increases.

It can be thus understood that measurement light can be turned ON and OFF by using this optical switching device and by turning ON and OFF the excitation laser beam.

Figure 24:
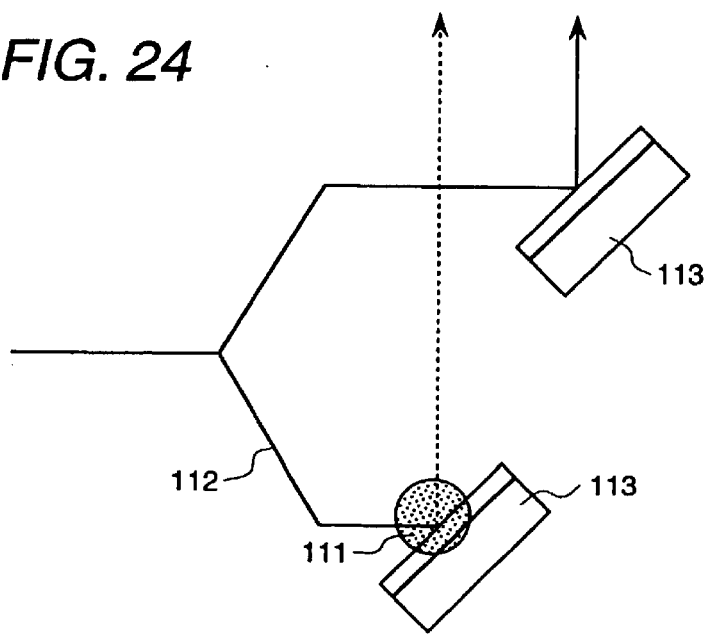
FIG. 24 is a schematic view of an optical switch according to an embodiment of the invention.

Next, this optical switching device is inserted into a Y branch optical circuit to produce an optical switch. FIG. 24 shows a construction of the optical switch so fabricated. In FIG. 24, reference numeral 111 denotes excitation light. Reference numeral 112 denotes an optical path. Reference numeral 113 denotes the optical switch element shown in FIG. 23. As shown in the drawing, a plurality of the same optical switches is mounted and excitation light 111 is applied to the optical switching device portion corresponding to the position at which light does not outgo. An optical switch for cutting off light is thus constituted. Light can be turned ON and OFF at an arbitrary position for an arbitrary time by using a signal specifying which outgoing portion causes excitation laser 111 to emit light.

Next, the response speed of this optical switch is examined. The response speed is measured by irradiating 1 ns pulse beam as signal light in a predetermined time interval to the optical switch, reducing the time interval and measuring a time capable of switching. Switching can be made when the time interval between the pulses is 5 ns. It is thus found that the optical switch of this embodiment has a response speed of the change of the refractive index of 5 ns or below and the refractive index resumes within a short time equivalent to the change ratio of the refractive index.

Further, the optical switches shown in FIG. 24 are arranged in array and a large-scale matrix optical switch can be fabricated. This matrix optical switch can suppress overall energy consumption by applying the optical switching device using the thin film that has a large change ratio of the refractive index. It can shorten the switching time of the optical switches, too.

As described above, when the nonlinear optical thin films according to the embodiment of the invention are used, it is possible to achieve recording media having a high recording density.

When the nonlinear optical thin films according to the embodiment of the invention are used, it is possible to achieve an optical switch having small energy consumption.

It should be further understood by those skilled in the art that the foregoing description has been made on embodiments of the invention and that various changes and modifications may be made in the invention without departing from the spirit of the invention and the scope of the appended claims.

What is claimed is:

1. A nonlinear optical thin film comprising one of an amorphous alloy and a mixture of the amorphous alloy and an oxide glass component formed on a substrate, wherein the nonlinear optical thin film is responsive to a change of intensity of light incident thereto for changing a refractive index thereof in accordance with a change of intensity of light.

2. An optical recording medium including at least a substrate having pits providing information and a super-resolution film on the substrate, wherein the super-resolution film is exposed to light irradiated thereto and formed one of an amorphous alloy and a mixture of the amorphous alloy and an oxide glass component.

3. An optical switch including at least one optical switching device and a controlling light irradiation device of the optical switch, wherein the optical switching device includes at least a substrate and a nonlinear optical thin film on the substrate, and the nonlinear optical thin film comprises one of an amorphous alloy and a mixture of the amorphous alloy and an oxide glass component, the nonlinear optical film having a refractive index which changes in response to a change in intensity of light incident thereto.

4. A nonlinear optical thin film formed on a substrate, wherein a refractive index of said nonlinear optical thin film reversibly changes in accordance with a change of intensity of light incident on said nonlinear optical thin film, and a change ratio ($|n_1-n_0|/n_0$) of a refractive index $n_0$ measured when intensity of laser light incident on said thin film is 0.1 GW/m² to the refractive index $n_1$ when measured at 5.0 GW/m² is at least 0.2.

5. A nonlinear optical thin film according to claim 4, wherein said nonlinear optical film contains at least two kinds of metals selected from the group consisting of Co., Cr, Ni, V, Mn, Ti, Zr, Hf and Ta as a principal component thereof.

6. A nonlinear optical thin film according to claim 4, wherein said nonlinear optical thin film contains $SiO_2$.

7. A nonlinear optical thin film according to claim 4, wherein said nonlinear optical thin film is nonmagnetic.

8. A nonlinear optical thin film according to claim 4, wherein said nonlinear optical thin film has a thickness of 50 to 100 nm thick.

9. A nonlinear optical thin film according to claim 4, wherein a reflection factor of said nonlinear optical thin film is at least 87%.

10. A nonlinear optical thin film formed on a substrate, wherein a refractive index of said nonlinear optical thin film reversibly changes in accordance with a change of intensity of light incident on said nonlinear optical thin film, and said nonlinear optical thin film contains Co—Cr—Zr or Ni—Cr—Zr alloy.

11. A nonlinear optical thin film according to claim 1, comprising the amorphous alloy.

12. A nonlinear optical thin film according to claim 1, comprising the mixture of the amorphous alloy and the and the oxide glass component.

13. An optical recording medium according to claim 2, wherein the super-resolution film is formed of the amorphous alloy.

14. An optical recording medium according to claim 2, wherein the super-resolution film is formed of the mixture of the amorphous alloy and the oxide glass component.

15. An optical switch according to claim 3, wherein the nonlinear optical thin film comprises the amorphous alloy.

16. An optical switch according to claim 3, wherein the nonlinear optical thin film comprises the mixture of the amorphous alloy the oxide glass component.

* * * * *